US009479469B2

(12) United States Patent
Kabbes et al.

(10) Patent No.: US 9,479,469 B2
(45) Date of Patent: Oct. 25, 2016

(54) COLLABORATIVE DRAFTING OF A MESSAGE

(71) Applicant: DROPBOX, INC., San Francisco, CA (US)

(72) Inventors: Steven Kabbes, Mountain View, CA (US); Adam Cue, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 38 days.

(21) Appl. No.: 14/577,813

(22) Filed: Dec. 19, 2014

(65) Prior Publication Data

US 2016/0182412 A1 Jun. 23, 2016

(51) Int. Cl.
| | |
|---|---|
| *G06F 15/16* | (2006.01) |
| *H04L 12/58* | (2006.01) |
| *H04W 4/12* | (2009.01) |
| *H04L 29/08* | (2006.01) |

(52) U.S. Cl.
CPC ....... *H04L 51/046* (2013.01); *H04L 29/08072* (2013.01); *H04L 51/00* (2013.01); *H04W 4/12* (2013.01)

(58) Field of Classification Search
CPC .. H04L 51/00; H04L 29/08072; H04L 29/06
USPC ......... 709/206, 220, 224, 228; 715/209, 744
See application file for complete search history.

(56) References Cited

U.S. PATENT DOCUMENTS

| | | | |
|---|---|---|---|
| 6,067,551 A | 5/2000 | Brown | |
| 6,405,225 B1 | 6/2002 | Apfel et al. | |
| 6,507,865 B1 | 1/2003 | Hanson et al. | |
| 7,325,196 B1* | 1/2008 | Covington | G06F 17/3089 715/209 |
| 7,325,197 B1* | 1/2008 | Massena | G06F 17/3089 715/209 |
| 7,380,202 B1* | 5/2008 | Lindhorst | G06F 17/30867 707/E17.109 |
| 7,437,421 B2 | 10/2008 | Bhogal et al. | |
| 7,529,780 B1 | 5/2009 | Braginsky | |
| 7,593,943 B2 | 9/2009 | Clarke | |
| 7,778,926 B1* | 8/2010 | Grinchenko | G06F 21/6218 705/50 |
| 7,865,545 B1* | 1/2011 | Estrada | G06F 21/6218 709/201 |

(Continued)

FOREIGN PATENT DOCUMENTS

WO 01/35211 A2 5/2001

OTHER PUBLICATIONS

"IMAP Synchronization Thunderbird Help," Mozilla Support, [online], Jul. 29, 2014, retrieved from the internet <URL: https://support.mozilla.org/en-US/kb/imap-synchronization>, 4 pages.

(Continued)

*Primary Examiner* — Khanh Dinh
(74) *Attorney, Agent, or Firm* — Page Ponsford; Stephanie Wang; DLA Piper LLP US

(57) ABSTRACT

Users of a message management service can collaborate to draft a message to a designated recipient. One user can create a draft message and identify one or more other users to collaborate on the draft. The users become authors of the draft, and the draft becomes available to each user through a drafts folder maintained for that user by the service. The users can each edit the draft. The message management service can send the draft as a message to the recipient when one or more of the collaborating users indicates that the draft should be sent. The message can include an indication that it is a collaborative message from all of the authors.

20 Claims, 18 Drawing Sheets

(56) References Cited

U.S. PATENT DOCUMENTS

| | | | |
|---|---|---|---|
| 7,870,204 B2 | 1/2011 | LeVasseur et al. | |
| 8,140,436 B2* | 3/2012 | Grinchenko | G06F 21/6218 705/317 |
| 8,196,029 B1 | 6/2012 | Rucker | |
| 8,352,870 B2 | 1/2013 | Bailor | |
| 8,370,298 B2 | 2/2013 | Strong et al. | |
| 8,453,052 B1 | 5/2013 | Newman | |
| 8,566,399 B2 | 10/2013 | Ferguson | |
| 8,606,855 B2* | 12/2013 | Bhogal | G06F 17/24 709/204 |
| 8,825,758 B2 | 9/2014 | Bailor | |
| 2002/0099777 A1 | 7/2002 | Gupta et al. | |
| 2004/0172450 A1 | 9/2004 | Edelstein et al. | |
| 2005/0033811 A1 | 2/2005 | Bhogal et al. | |
| 2005/0160145 A1 | 7/2005 | Gruen et al. | |
| 2006/0136513 A1 | 6/2006 | Ngo et al. | |
| 2006/0242204 A1 | 10/2006 | Karas | |
| 2007/0016647 A1 | 1/2007 | Gupta et al. | |
| 2009/0216843 A1 | 8/2009 | Willner et al. | |
| 2011/0313972 A1 | 12/2011 | Albouze | |
| 2012/0185434 A1 | 7/2012 | Giampaolo et al. | |
| 2013/0262373 A1 | 10/2013 | Rampson | |
| 2014/0337278 A1 | 11/2014 | Barton | |

OTHER PUBLICATIONS

"How to view earlier version of current draft," Google Groups, 2012, [online], <URL: https://productforums.goggle.com/forum/#!topic/gmail/IWLst1ppUic>, 1 page.

"How does track changes in Microsoft Word Work," ShaunaKelly.com, 2010, [online], retrieved on Apr. 3, 2015, <URL: http://shanuakelly.com/word/sharing/howtrackchangesworks.htm,> 10 pages.

"Microsoft Word—Working with Versions of Your Documents," About.com, (Wayback Machine date of Apr. 1, 2013), [online], retrieved on Apr. 3, 2015, <URL: http://wordprocessing.about.com/library/WordTutorials/blversions2.htm,> 2 pages.

"Google Drive and Docs—Sharing and Collaborating," by Goodwill Community Foundation, (Wayback Machine date of May 2013), [online], <URL: http://www.gcflearnfree.org/googledriveanddocs/6>, 14 pages.

Office Action mailed Apr. 9, 2015 in U.S. Appl. No. 14/552,166, 12 pages.

Citro, et al., "Conflict Management for Real-Time Collaborative Editing in Mobile Replicated Architectures," ACM, 2007, 10 pages.

Office Action mailed Oct. 20, 2015 in U.S. Appl. No. 14/552,166, 18 pages.

* cited by examiner

```
         ⎧ Sender: allie@domain1.com  ──────1103
         ⎪ From: allie@domain1.com  ────────1104
         ⎪ To: boss@domain1.com
  1102  ⎨  SendDate: 2014-11-30
         ⎪ Subject: Status of Auto Updates
         ⎪ X-Mbx-Collaborators: allie@domain1.com,     ⎫
         ⎩ brad@domain1.com,chris@domain2.com,doug@domain1.com  ⎬ 1106
                                                                ⎭

...
         ⎧ <if not-mbx>
  1110  ⎨  Nancy, Adam, Belinda, and Tony sent: ──1112
         ⎩ </if not-mbx>
```

FIG. 11A

```
Sender: allie@domain1.com
From: allie@domain1.com,brad@domain1.com,chris@domain2.com,
      doug@domain1.com      ⎫
To: boss@domain1.com         ⎬──1150
SendDate: 2014-11-30
Subject: Status of Auto Updates
```

FIG. 11B

COLLABORATIVE DRAFTING OF A MESSAGE

CROSS-REFERENCES TO RELATED APPLICATIONS

The subject matter of this application is related to commonly-owned co-pending U.S. patent application Ser. No. 14/552,166, filed Nov. 24, 2014, the disclosure of which is incorporated herein by reference for all purposes.

BACKGROUND

This disclosure relates generally to email services and in particular to email services that facilitate collaborative drafting of an email message by multiple users.

Individuals are becoming increasingly reliant on electronic messaging services, such as email services, instant messaging services, SMS/MMS (also referred to as text-messaging) services, and so on. Such services allow users to send and receive messages. In some instances, the services may also provide additional features related to managing messages, such as the ability to store or archive messages in folders, delete messages, search stored messages, and so on.

Many users who rely on electronic messaging services use various electronic devices, such as laptop or desktop computers, smart phones, tablets, and so on, that are capable of connecting to various data networks and acting as clients of an electronic messaging service. For example, a client can receive messages from a messaging service and can provide a user interface that allows the user to interact with messages, e.g., by replying to messages, deleting messages, archiving messages, composing new messages to be sent, etc. When connected to a data network, the client device can communicate updates from the messaging service to the user and can communicate instructions to the messaging service to implement user actions. With the growing popularity of mobile devices, users can access their messages almost anytime and almost anywhere.

SUMMARY

Users of electronic messaging services sometimes need to collaborate with other users in the course of creating a message. Collaboration can take various forms, such as when one user provides factual information or portions of the message text to another user, or when one user revises, formats, or proofreads a message whose substantive content was drafted by another. With existing systems, such collaboration can be tedious. For instance, a first user can draft a message and send it to one or more other users. The other user(s) can reply with their input, but then the first user is often tasked with merging the inputs into the final message.

Certain embodiments of the present invention provide collaborative drafting of messages, including but not limited to email messages. A "creating" user who is drafting a message can, at any point, decide to make the draft a "collaborative draft." To do so, the creating user can identify one or more other users as "collaborating users" (also referred to as "collaborators"). For example, the creating user can operate a client of a message management service to draft the message. The client interface can provide user-operable controls via which the creating user can identify the collaborating users and send an instruction to the message management service to create a collaborative draft. The message management service can generate invitations to the identified collaborating users. A collaborating user who accepts can thereby become an author of the message, along with the creating user. The authors can collaborate to edit the message using various real-time and/or non-real-time techniques for collaborative editing supported by the message management service. When the authors determine that the message is ready to be sent, one (or all) of them can so instruct the message management service. The message management service can send the message to the designated recipient(s) and can include in the message an indication that the message is a collaborative message jointly from all of the authors.

Some aspects of the present invention relate to servers and to methods that can be performed at a server, such as a server provided by a message management service that communicates with various clients (e.g., client devices belonging to two or more different users). The server can receive a request from a client belonging to a creating user to create a collaborative draft of a message. The request can include an identifier of a message recipient, an identifier of one or more collaborating users, and message content. The server can store the draft message in association with an author list identifying multiple authors for the message, where the authors including the creating user and the collaborating user(s). The server can generate and send an invitation to each collaborating user at a client belonging to that collaborating user. The invitation can include a representation of the message content, as well as other information (e.g., identifying the creating user, recipient(s), etc.). If the collaborating user accepting the invitation, the server can be notified and can add the draft message to a drafts folder maintained by the server for the collaborating user. Thus, each collaborating user (and the creating user) can access a collaborative draft message through their drafts folder, as with other messages they may be in the process of drafting and editing. The server can also receive updates to the draft message from the authors; any or all of the authors can update the draft. The server can store an updated draft message based on the received updates and can propagate the updated draft to some or all of the authors. In response to a send instruction from one or more of the authors, the server can send the updated draft message as a message to the message recipient. The message can include information (e.g., a header field) identifying each of the authors.

Updating a draft and propagating the updates to clients of the various authors can be handled using a number of different techniques. In some embodiments, real-time collaboration can be supported, with the server receiving updates from one client and propagating them to others without intentional delay. (It is to be understood that inevitable communication delays may occur; hence, "real time" does not mean instantaneous.) In some embodiments, it may be the case that not all authors are viewing or editing the draft at any given time, and one or more authors' clients might be offline (i.e., not connected to the server). Accordingly, in some embodiments, the server can propagate updates to a particular client when the client happens to be accessible to the server. The client can generate notifications of updates to the author.

In some embodiments, an author can edit a collaborative draft by replying to the invitation and incorporating edits directly into the reply. The server can receive an edited reply message, compare the edited version of the message content to the message content that was included in the invitation, and identify changes to the message content based on the comparison. The server can incorporate these changes into the updated draft message.

In some embodiments, a message can be sent when one author approves or when all the authors approve. Other criteria can also be specified. For purposes of sending the message, the server can select one of the authors (e.g., the creating user) to be treated as the message sender. The server can identify a messaging-service account (e.g., an email account) of the message sender and can send that message using the identified account.

Some aspects of the present invention relate to clients and to methods that can be performed at a client, e.g., a client device belonging to a specific user and being capable of communicating with a message management service. The client can present an editing interface operable by the user to create and edit a draft message. The editing interface can include a user-operable share control and a user-operable send control. At any point during creation and/or editing of a message, the user can operate the share control. If the user operates the share control, the client can prompt the user to identify one or more other users as collaborating users and can send an instruction to the message management service to create a collaborative draft message. The instruction can include a current version of a draft message created in the editing interface as well as identifiers of the one or more collaborating users. Thereafter, the client can receive updates to the collaborative draft message from the message management service, where the updates originate from one or more of the collaborating users. If the user operates the send control, the client device can send an instruction to the message management service to send the collaborative draft message to the recipient. A user (either a creating user or collaborating user) can access a collaborative draft in progress via a drafts folder maintained for that user by the message management service.

The following detailed description together with the accompanying drawings will provide a better understanding of the nature and advantages of the present invention.

BRIEF DESCRIPTION OF THE DRAWINGS

FIGS. 11A and 11B show pseudocode examples of incorporating identifiers of multiple authors into an email message according to an embodiment of the present invention.

DETAILED DESCRIPTION

Certain embodiments of the present invention provide collaborative drafting of messages, including but not limited to email messages. A "creating" user who is drafting a message can, at any point, decide to make the draft a "collaborative draft." To do so, the creating user can identify one or more other users as "collaborating users" (also referred to as "collaborators"). For example, the creating user can operate a client of a message management service to draft the message. The client interface can provide user-operable controls via which the creating user can identify the collaborating users and send an instruction to the message management service to create a collaborative draft. The message management service can generate invitations to the identified collaborating users. A collaborating user who accepts can thereby become an author of the message, along with the creating user. The authors can collaborate to edit the message using various real-time and/or non-real-time techniques for collaborative editing supported by the message management service. When the authors determine that the message is ready to be sent, one (or all) of them can so instruct the message management service. The message management service can send the message to the designated recipient(s) and can include in the message an indication that the message is a collaborative message jointly from all of the authors.

Figure 1:
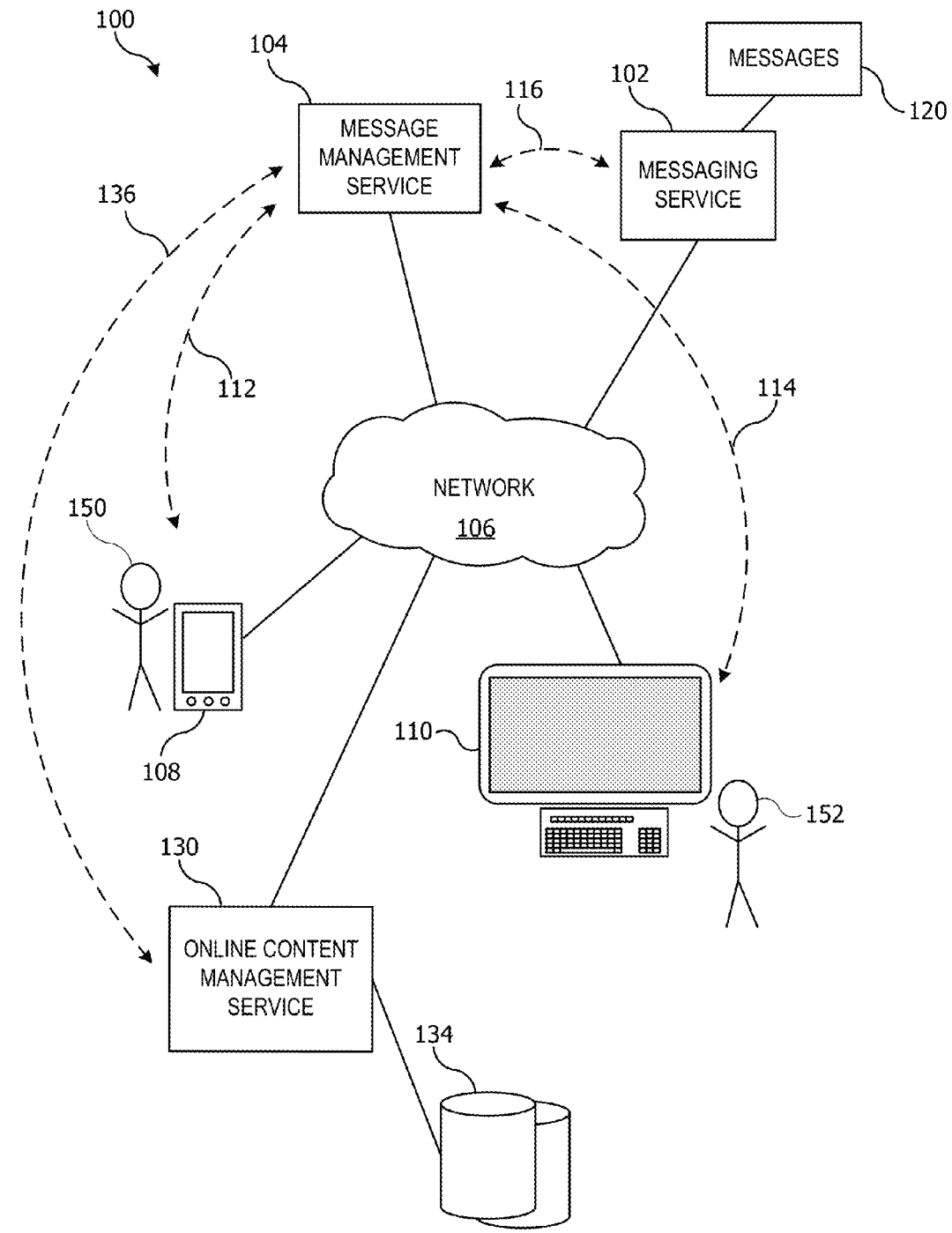
FIG. 1 shows a block diagram of communication system according to an embodiment of the present invention.

FIG. 1 shows a block diagram of communication system 100 according to an embodiment of the present invention. Communication system 100 can include messaging service 102, message management service 104, and online content management service 130 connected to network 106. Also connected to network 106 can be various clients 108, 110 that can be used to access messaging service 102, an online content management service 130, and/or message management service 104. In this example, clients 108, 110 each access message management service 104 (as indicated by dashed arrows 112, 114).

Online content management service 130 can include, for example, a file storage service, a file sharing service, a social media service that allows users to post messages and/or other content, and so on. Online content management service 130 can communicate with one or more data stores 134.

Online content management service 130 can be hosted on servers maintained by a service provider and accessed via a network 106, such as the Internet. In some embodiments, online content management service 130 can store content in one or more data sources (e.g., a database). The content can include audio, video, data, images, files, email messages, a draft of an electronic document (e.g., a draft of a message), and the like. In some embodiments, online content management service 130 can access message management service 104, or vice versa (as indicated by dashed arrow 136) and can support various operations provided by message management service 104, including collaborative editing of message drafts as described below.

Messaging service 102 can be any service that allows users to send, receive, store, and/or access messages, where a "message" can include any electronic communication generated by a sender and directed to one or more recipients, such as email messages, instant messages (e.g., messages sent between users using various "chat" services), SMS/MMS messages (e.g., messages conforming to Short Messaging Service and/or Multimedia Messaging Service protocols supported by various cellular and other wireless data networks), voice messages, photo/image messages, social network messages, and so on. Examples of messaging service 102 can include email services such as Gmail™ (a service of Google Inc.) and Yahoo! ® Mail (a service of Yahoo! Inc.). Other examples can include instant messaging or chat services such as Gmail's chat feature or Facebook's chat feature (a service of Facebook, Inc.), SMS/MMS services provided by cellular data carriers, or social network services with a messaging component (e.g., social networks provided by Facebook, Inc., or LinkedIn Corp.). In some embodiments, a user can establish an account with messaging service 102, and messaging service 102 can store and provide access to user's messages 120. Messaging service 102 can also provide web-based client interfaces, dedicated application programs, application program interfaces (APIs), and/or other tools for facilitating user access to messages 120.

Message management service 104 can be a service that acts as a proxy or intermediary between messaging service 102 and a client 108, as indicated by dashed arrow 116. Message management service 104 can provide enhanced functionality for organizing, storing, accessing, composing, and/or responding to messages 120 stored by messaging service 102. One example of message management service 104 can be the Mailbox service of Dropbox, Inc.

Clients 108 and 110 can be user-operated computing devices that can execute software to interact with online content management service 130, message management service 104, and/or messaging service 102. Various types of computing devices can be used, including desktop computers, laptop computers, tablet computers, smart phones, wearable computing devices, personal digital assistants, and so on. By way of example, client 108 can be a smart phone that can execute an application program (also referred to as an app) to communicate with message management service 104 via network 106. Client 110 can be a desktop or laptop computer that can execute an app to communicate with message management service 104 via network 106. This app can be, for example, a mail client app built into an operating system of the computer, a web browser that interfaces with a web-based messaging service, a service-specific application, or another app.

For purposes of illustration, client devices 108, 110 are assumed to belong to two different users 150, 152. As used herein, a client is said to "belong to" a particular user when the client is in a state such that message management service 104 has associated the client with that user. For instance, if a particular user logs into her account at message management service 104 from a particular client, that client can be deemed to belong to the user until such time as the user logs out. (For some clients, the login can persist indefinitely.)

For either client 108 or 110, the app (or web interface) can be provided by a provider of message management service 104 and can be customized to allow access to enhanced message management functions such as collaborative drafting of messages. For example, interfaces of client 108 and client 110 can be configured to allow different users (e.g., users 150, 152) to collaboratively edit (e.g., create, read, modify, update, or delete) a message as described herein. In some embodiments, the same user can also operate different clients to continue editing the draft. Each client can receive input from its user and communicate appropriate instructions to message management service 104 and/or online content management service 130 to update the draft.

A given user 150, 152 can have accounts with both messaging service 102 and message management service 104. The user's account with message management service 104 can be linked to the user's account with messaging service 102, allowing the user to use message management service 104 to manage messages 120 sent and received via messaging service 102. In some embodiments, a user can have multiple accounts with one or more messaging services 102 and can link any or all of these accounts to a single account with message management service 104. In some embodiments, a given user can have accounts with both messaging service 102 and/or online content management service 130. In such embodiments, the user's account with message management service 104 can be linked or associated with the user's account with online content management service 130 (or the same account can provide access to both services).

In some embodiments, enhanced functionality provided by message management service 104 can include facilitating collaborative drafting of a message (e.g., an email message) by two or more different users using different client devices (e.g., client 108 used by first user 150 and client 110 used by second user 152). For example, first user 150, acting as a "creating user," can begin drafting a message using client device 108. At any point during the drafting, creating user 150 can designate one or more other users (referred to herein as "collaborating users") to collaborate on the draft, such as second user 152. When creating user 150 designates one or more collaborating users 152, the current version of the draft can be received and stored by message management service 104. Information (metadata) associated with the draft can include an author list that identifies creating user 150 and each collaborating user 152 as authors of the draft. Message management service 104 can send an invitation to each collaborating user 152 to invite them to edit the draft, and each collaborating user 152 can receive the invitation at his or her own client 110. By accepting the invitation, collaborating user 152 can obtain access to the collaborative draft via a draft messages folder as described below, allowing collaborating user 152 as well as creating user 150 to edit the draft, e.g., by adding, deleting, or modifying content. Message management service 104 can facilitate the collaborative drafting, e.g., by receiving an update from one of clients 108, 110 and propagating the update to the other of clients 108, 110. In some embodiments, receiving and propagating of updates can occur in real time, although this is not required.

Once the drafting is completed, one or more of the authors (e.g., either creating user 150 or collaborating user 152 or both) can instruct message management service 104 to send the message to one or more designated recipients. The designated recipient(s) might or might not include the creating and/or collaborating users. Message management service 104 can include author-identifying information in the message that is sent, such as email addresses of each user in the author list, including the creating and collaborating users. In some embodiments, the recipient's client device can display the author-identifying information in a manner such that the recipient is made aware that the message is the result of collaborative drafting. For instance, instead of identifying the message as being "from" a single sender, the message can be identified as being "from" all of the users who were involved in drafting it. Specific examples of message formats and collaborative message identification are described below.

Message management service 104 can store message drafts received from clients and can manage information about the draft, including a current version of the draft and an author list identifying the users who have rights to access the draft. Message management service 104 can also push the current version of a draft to other clients that can communicate with message management service 104, including clients belonging to other authors of a collaborative draft. Clients can update their version of the draft of an electronic document based on the current version of a draft received from message management service 104. The "current version" of a draft can refer to the most recently updated and synchronized version of the draft received from message management service 104. Synchronization of the draft across the client devices can leverage techniques described in above-referenced U.S. patent application Ser. No. 14/552,166. In the present context, the set of clients across which a collaborative draft is synchronized can include clients belonging to different users as well as multiple clients belonging to the same user.

In some embodiments, message management service 104 can store a draft (e.g., a current version of a draft) of a message in association with an account of a user, e.g., in a drafts folder defined for and assigned to that user. Where the draft is a collaborative draft, the draft can be associated with accounts of all authors in the associated author list. Accordingly, access to update and/or send a collaborative draft can be permitted on any client via the account of an author. In some embodiments, message management service 104 and/or a client can store draft messages in storage that is separate (e.g., physically separated in different storage devices or logically separated in memory) from storage for messages that have been sent or received.

In various embodiments, message management service 104 can store drafts locally, at messaging service 102 (in association with an account maintained by the user with messaging service 102), at online content management service 130 (in association with an account maintained by the user with online content management service 130, or any combination thereof. Depending on implementation, storage used for the draft of the message may not be counted towards any limit, threshold, or quota of storage allocated for a particular user account.

Message management service 104 can communicate with multiple clients, including clients belonging to different users, to synchronize drafts stored on those clients. For example, after receiving an update to a collaborative draft from client 108, message management service 104 can send a current draft along with associated version information to clients belonging to all users on the author list for the collaborative draft (e.g., client 110). A client and/or message management service 104 can implement techniques or algorithms, such as vector clocks, to track revisions of a draft based on partial ordering of events. For example, message management service 104 can maintain data in a data structure (e.g., a vector) that stores version information for each client. The version information for a client can include a value corresponding to a version of a draft stored by that client. Initially, the value can be a default value (e.g., a value of 0) when no draft of an electronic document is stored on the client. When a draft is received by a client, the client can store the draft and adjust (e.g., increment) the value to reflect a new version corresponding to the stored draft. Each time a client updates a draft, a value corresponding to a version of the draft resident on the client can be adjusted (e.g., incremented) in the data structure to reflect the updated version. The version information for the client's draft can be provided to message management service 104 along with the updated version of the draft.

In some embodiments, message management service 104 can receive updated versions of a draft message from multiple clients, including clients belonging to different authors in the case of a collaborative draft. Where this occurs, message management service 104 can perform conflict resolution operations to reconcile the updates and establish a new current version of the draft. Message management service 104 can synchronize the current draft across the client devices. Examples of techniques that can be used are described in above-referenced U.S. patent application Ser. No. 14/552,166.

In some embodiments, message management service 104 can receive a request from a client to send a collaborative draft as a message to one or more designated recipients. In the case of a collaborative draft, the request can be received from a client belonging to any of the users on the author list. Along with the request to send (or separately), message management service 104 can receive information indicating the designated recipient(s) of the message, other information to send in the message, or combinations thereof. Message management service 104 can send the collaborative draft as a message on behalf of any number of authors and/or to any number of recipients. For example, message management service 104 can identify an account at messaging service 102 associated with each author and can send the draft of a message using one of the identified accounts. Message management service 104 can include in the message information identifying all of the authors of the collaborative draft (e.g., an email address or other account identifier for each author).

For a collaborative draft, each user can access the draft message via a user interface on the client that displays information about draft messages stored on the client. For example, the interface can take the form of a "drafts" folder, familiar to many users of email clients. The collaborative draft can be presented as an item in the drafts folder, optionally with visual indicia to identify it as a collaborative draft and/or to indicate whether other authors have updated it. If the user selects the collaborative draft for editing, the client can present an editing interface, examples of which are described below. The editing interface can allow the user to edit the message and to propagate updates to the other authors collaborating on the draft (either automatically or upon specific user instruction). The editing interface can also provide a control operable to send the draft as a message to the designated recipient(s). Specific examples are described below.

Figure 2:
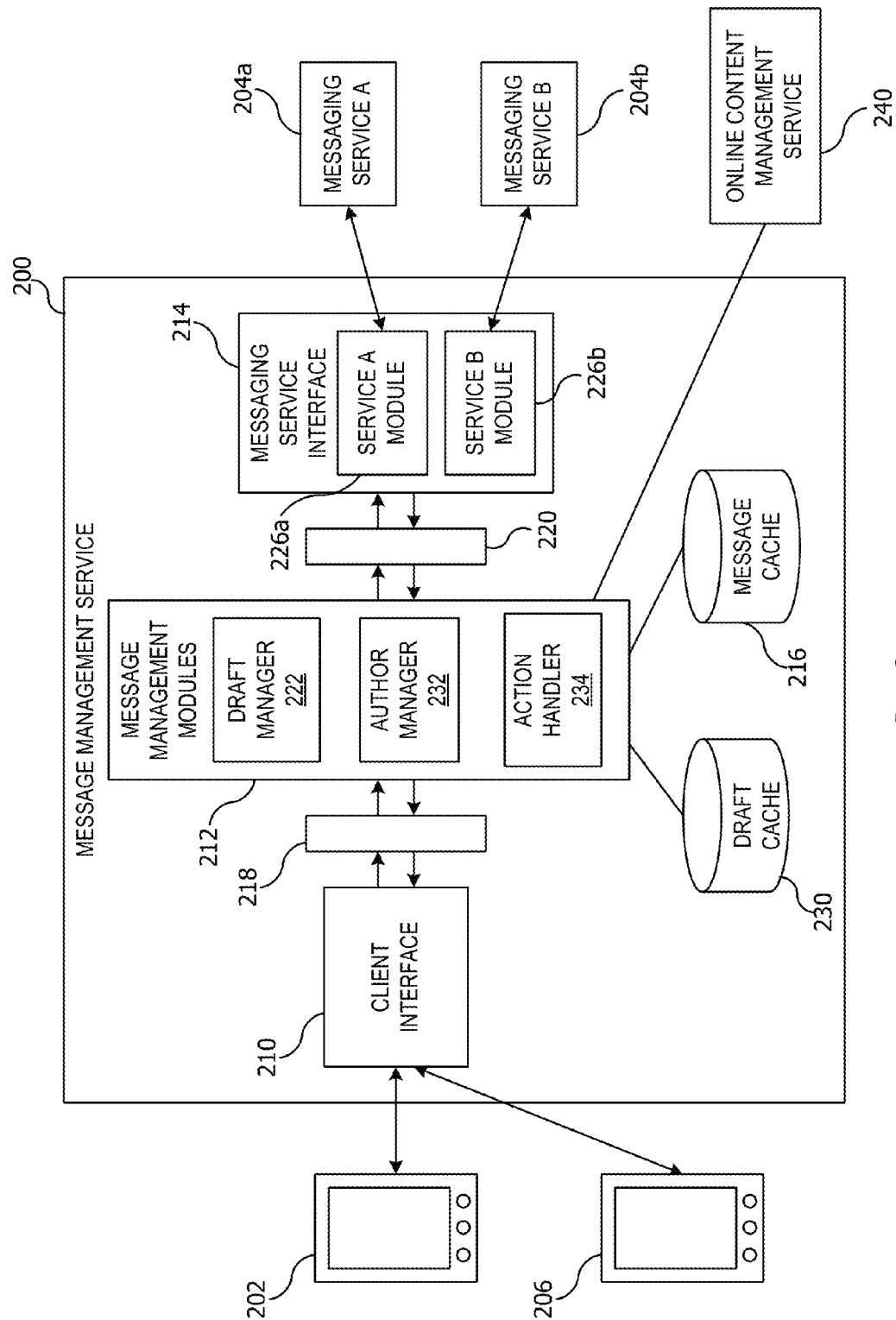
FIG. 2 shows a block diagram of a message management service according to an embodiment of the present invention.

FIG. 2 shows a block diagram of a message management service 200 according to an embodiment of the present invention. Message management service 200 can implement message management service 104 of FIG. 1. For example, message management service 200 can act as an intermediary between one or more clients, such as client 202 (e.g., implementing client 108) and client 206 (e.g., implementing client 110), and various messaging services 204a, 204b (e.g., implementing messaging service 102) of FIG. 1. Each service 204a, 204b can be a different messaging service, such as different email services, an email service and a social network service, and so on. While two messaging services 204 are shown, any number of messaging services 204 can be supported by a single message management service 200.

Message management service 200 can include client interface 210, message management modules 212, messaging service interface 214, message cache 216, and draft cache 230. Client transfer layer 218 can provide transfer queues for transferring messages and other instructions and information between client interface 210 and message management modules 212, and service transfer layer 220 can provide transfer queues for transferring messages and other instructions and information between message management modules 212 and messaging service interface 214.

Client interface 210 can communicate with multiple instances of client 202 (e.g., clients associated with different users and/or multiple clients associated with the same user). For instance, client interface 210 can deliver "inbound" messages from messaging services 204a, 204b to client 202, receive "outbound" messages from client 202, and/or receive various message processing instructions from client 202, such as instructions related to managing a collaborative draft message.

Message management modules 212 can include functional blocks or modules configured to perform various operations on messages received by message management service 200, including outbound messages received from client 202 as well as inbound messages received from messaging services 204a, 204b. Message management modules 212 can be configured to perform one or more operations to manage collaborative drafts of messages. For example, message management modules 212 can include draft manager 222, author manager 232, and action handler 234.

Messaging service interface 214 can include various service modules 226a, 226b, each of which can be configured to communicate with a different one of messaging services 204a, 204b. For example, different messaging services 204 can support different communication protocols for access by external clients (e.g., IMAP, POP, MAPI/Exchange, custom APIs, and so on), and each service module 226 can be configured to use the appropriate protocol for a particular messaging service 204.

In some embodiments, messaging service interface 214 can present itself to messaging services 204a, 204b as a client accessing functionality of messaging services 204a, 204b, so that the existence of message management service 200 can be transparent to messaging services 204a, 204b. For example, if messaging service 204a supports IMAP, service module 226a can establish a persistent IMAP connection to a user's account with messaging service 204a, allowing messaging service 204a to deliver any incoming messages it receives for the user's account to message management service 200. Persistent connections to other services than IMAP can also be maintained, or messaging service interface 214 can periodically poll messaging services 204 to obtain new messages. The persistent connection can be maintained regardless of whether the user currently has any client 202 connected to client interface 210, and message management service 200 can maintain synchronization with messaging services 204.

Message cache 216 can be a database or other data store that provides storage and retrieval of messages. For example, messages can be stored and retrieved by reference to message identifiers (message IDs) assigned to each message by message management service 200 and/or messaging services 204. Message management service 200 can use message cache 216 to store copies of messages that are likely to be of interest to a client, such as recently received messages or messages found in a user-initiated search. Messaging services 204 can maintain their own message stores independently of any action by message management service 200. In some embodiments, messaging service 204 can maintain a primary store of messages for a user that can include all messages currently associated with that user's account (e.g., including sent messages, received messages, archived messages, etc.), and message cache 216 can store a subset of the user's messages as well as information about additional messages in the primary store. If client 202 requests a message that is not presently stored in message cache 216, message management service 200 can retrieve the message from the appropriate messaging service 204 and deliver it to client 202.

Draft cache 230 can be a database or other data store that provides storage and retrieval of one or more draft messages, including collaborative draft messages. For example, a draft message can be stored and retrieved by reference to document identifiers assigned to each draft by message management service 200. In some embodiments, the draft message can be stored in association with version information that indicates a version of the draft, e.g., to facilitate synchronization across clients, including clients belonging to different users. Draft cache 230 can also be used to store metadata pertaining to drafts, such as version information, author lists, recipient identifiers, and so on. Examples are described below.

In some embodiments, draft cache 230 can store draft messages without consuming storage intended for actual (i.e., sent and/or received) messages. The draft can be associated with a user's account on one of messaging services 204 but need not be actually stored at messaging service 204. Additionally or instead, the draft can be associated with the user's account on message management service 200. In some embodiments, a draft can also be associated with one or more actual messages; for instance, if the draft is a reply to a previously received message, it may be useful to associate the draft with the received message.

In operation, message management service 200 can obtain inbound messages from messaging services 204 and provide the messages to client 202. Message management service 200 can also receive outbound messages (e.g., messages to be sent) from client 202 and provide the messages to messaging service 204 for delivery to the recipient(s). Message management modules 212 can perform various operations on inbound and/or outbound messages. In addition, message management service 200 can receive draft messages and related information (e.g., updates to a draft, identifiers of collaborating users, instructions to send the message to the designated recipient(s), etc.) from client 202 and can perform operations in response to the received drafts and related information. For example, message management service 200 can store the draft and related information (e.g., in draft cache 230), propagate the draft and/or related information to other clients (e.g., client 206), send the draft as a message to a designated recipient, etc.

For example, in some embodiments, message management modules 212 can operate to manage a collaborative draft of a message across clients, e.g., client 202 and client 206, which can belong to different users. A draft can be received from a client, e.g., client 202, belonging to a creating user. The draft can be created as a new message, or it can be created as a response to a message previously received via the creating user's account with one of messaging services 204.

Draft manager 222 can manage and synchronize a draft message between clients, e.g., client 202 and client 206, which can belong to different users. For example, draft manager 222 can manage storage of draft of a message based on version information. When received, a draft can be managed in storage by association with an account, e.g., an account provided by message management service 200, an account provided by one of message services 204, or an account provided by online content management service 130. In some embodiments, draft manager 222 (or other message management modules 212) can maintain and update version information for a draft and use the version information to synchronize the draft across clients, e.g., as described in above-referenced U.S. application Ser. No. 14/552,166.

Author manager 232 can manage author information for a collaborative draft. For example, author manager 232 can create and update a list of authors, including the creating user and any users that have been invited to collaborate. The author information can include which users have accepted or declined invitations to collaborate, specific permissions granted to each author, whether the author has approved the draft, and so on. Author manager 323 can use the author information to generate invitations to collaborating authors and to notify authors regarding activities of other authors (e.g., when an author accepts an invitation to collaborate, edits or sends the draft, etc.).

Action handler 234 can process requests received from a client to perform one or more actions using a draft of message. For example, a client can request that a draft be processed as a collaborative draft, and such a request can designate one or more other users as collaborating users. Action handler 234 can interact with author manager 232 and other message management modules 212 to process the request.

Action handler 234 can process other requests, such as requests to send the collaborative draft as a message. In this case, action handler 234 can select one of the authors' accounts at one of messaging services 204 to act as the sender for the message and can format the message for delivery via the selected messaging service 204. In some embodiments, the selected messaging service 204 is a service on which the creating user has an account and the creating user is designated as the "sender" of the message. Alternatively, the selected messaging service 204 can be a service on which the author who directs message management service 200 to send the message has an account, and that author can be designated as the "sender." Formatting operations can include adding headers such as a recipient identifier (e.g., email address of each recipient identified by the authors), sender identifier (e.g., email address of the account via which the message is being sent), author identifier (e.g., email addresses, user names, or other identifiers of all authors), and so on.

It will be appreciated that message management service 200 is illustrative and that variations and modifications are possible. For example, other message management modules and/or operations can be provided. In some embodiments, message management can include windowing (selecting and immediately delivering to a client a fixed number of messages deemed likely to be relevant, such as the 50 or 100 or some other number of most recent messages), backfilling (populating message cache 216 with messages in anticipation of client requests), message format conversion (e.g., converting between a message format used by a messaging service and a format optimized for display on a client), management of message folders or streams, message sorting, management of drafts of electronic documents, management of attachments, synchronization with messaging services 204 (e.g., relaying instructions from client 202 to move or modify messages) and so on. In some embodiments, some or all of the draft-management operations described herein can be delegated to online content management service 240, which can be similar or identical to online content management service 130 of FIG. 1.

Figure 3:
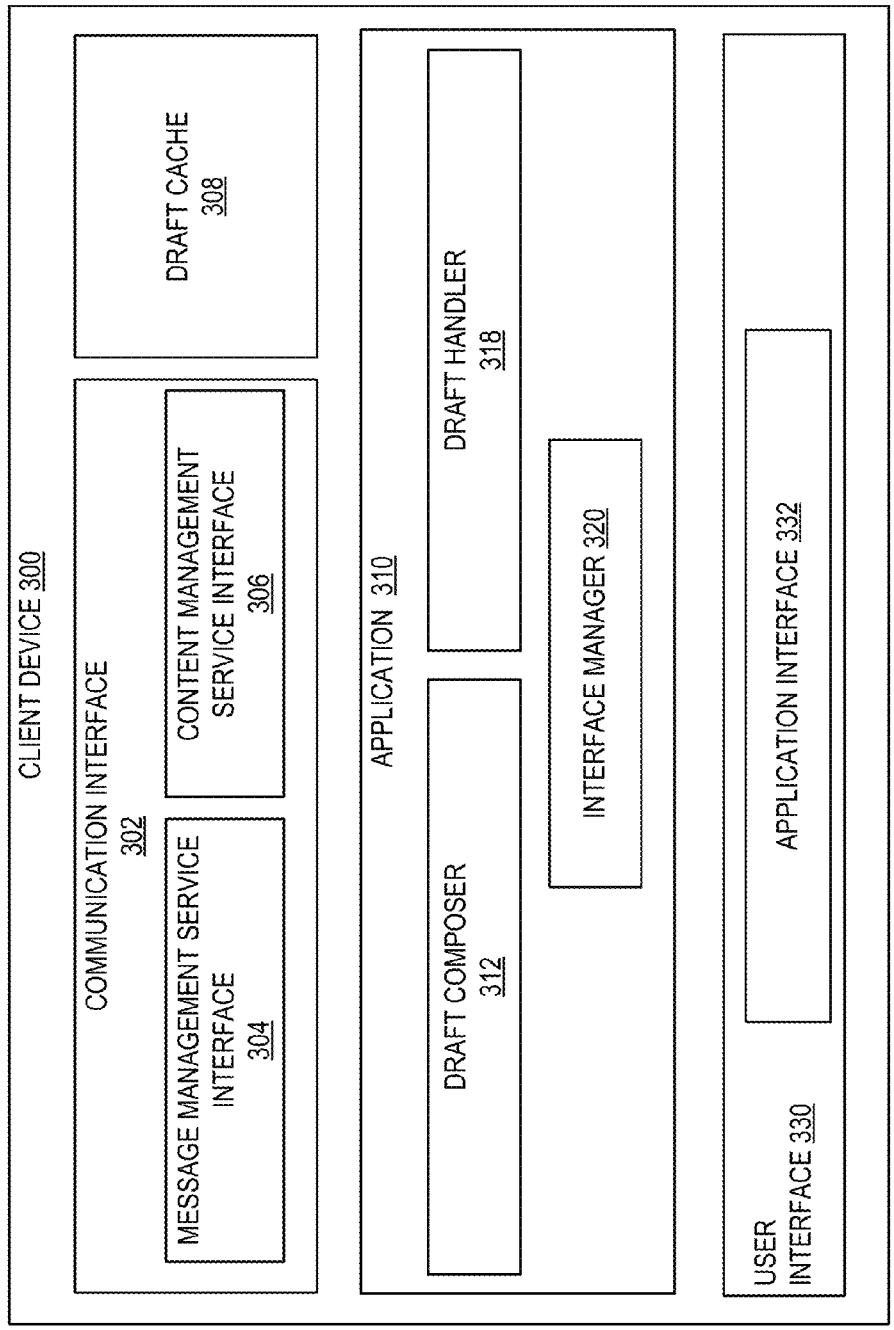
FIG. 3 shows a block diagram of client device according to an embodiment of the present invention.

FIG. 3 shows a block diagram of client device 300 according to an embodiment of the present invention. Client device 300 can implement any of client devices 108, 110 of FIG. 1 or client devices 202, 206 of FIG. 2. Client device 300 can be a user-operated computing device that can be implemented using hardware, firmware, software, or combinations thereof to interact with online content management service 130, message management service 104, and/or messaging service 102. Examples of client device 300 can include, without limitation, a desktop computer, a laptop computer, a tablet computer, a smart phone, a wearable computing device, a personal digital assistant, and so on. Client device 300 can include user interface 330. Interface 330 can include a physical interface, a graphical interface (e.g., a graphical user interface), or a combination thereof.

In some embodiments, client device 300 can provide access to application 310 ("app"). App 310 can enable a user to access and perform enhanced functions provided by one or more management services, e.g., message management service 200 or online content management service 130. For example, app 310 can be customized to allow access to enhanced functions such as collaborative drafting of messages. App 310 can be accessed via interface 330 of client device 300. In some embodiments, user interface 330 can include or implement application interface 332 (e.g., a graphical interface), which enables user interaction with app 310.

In some embodiments, application interface 332 can enable a user to operate app 310 to view, manage, and/or compose a draft message (e.g., as described below). When client device 300 receives a request via application interface 332 to perform one or more actions to manage a draft message, app 310 can process the request to perform the action(s). Examples of processing actions can include client device 300 communicating appropriate instructions (e.g., including a draft, version data, and collaborating user identifiers, as described below) to message management service 104 and/or online content management service 130. Examples of application interfaces (e.g., application interface 332) implemented for app 310 are described below.

Client device 300 can implement communication interface 302 that includes functional blocks or modules, each of which can be configured to handle communications for client device 300, e.g., communications with different types of management services. In some embodiments, communication interface 302 can implement a network interface, web interface, or other remote communication interface, to enable app 310 to communicate with a remotely located management service. For example, communication interface 302 can include content management service interface 306 and/or message management service interface 304. Each interface 304, 306 can be configured to use an appropriate protocol for communication with a particular management service. Message management service interface 304 can be configured to communicate with a message management service, e.g., message management service 200. Content management service interface 306 can be configured to communicate with a content management service, e.g., online content management service 240.

App 310 can be implemented by one or more application modules. App 310 can be, for example, implemented as a client app executing on an operating system of client device 300, a web browser that interfaces with a web-based messaging service, a service-specific application provided by the provider of messaging service 204 or the provider of message management service 200, or another app. For example, app 310 can be implemented by a provider of message management service 204 or online content management service 240, and accessed from client device 300 via application interface 332. In some embodiments, all or part of the modules of app 310 can be stored and executed locally on client device 300 to operate app 310. For example, all or part of the modules of app 310 can be installed with client device 300 or can be stored after receipt from a computing system, e.g., message management service 200 or an online application distribution service, accessible to client device 300. In some embodiments, all or part of the modules of app 310 can be hosted and executed remotely on a computing system, e.g., message management service 200, accessible to client device 300. App 310 can communicate with a management service, e.g., message management service 200 and/or online content management service 240, via communication interface 302.

In some embodiments, app 310 can by implemented by functional blocks or modules including draft composer 312, draft handler 318, and interface manager 320. Client device 300 can include draft cache 308 to manage local storage of draft messages and related information.

Draft cache 308 can be a database or other data store that provides storage and retrieval of one or more draft messages. For example, a draft message can be stored and retrieved by reference to document identifiers assigned to each draft by client device 300. Client device 300 can use draft cache 308 to store a draft of a message that has been composed using client device 300 or a copy of a draft message (e.g., a collaborative draft message) that was composed using another client device (e.g., a client belonging to a different user) and synchronized to client 300 by message management service 200. A draft can be managed in storage in association with information indicating the version of the draft, as well as information identifying other authors of the draft (for a collaborative draft). Specific examples are described below.

Draft composer 312 can perform operations to compose a draft message (e.g., creating, editing, collaborating with other authors). A draft message can be composed based on input received via application interface 332, which can be used to create or modify a draft message stored in draft cache 308.

Interface manager 320 can perform operations to generate and/or display application interface 332 via interface 330. Interface manager 320 can process input received via application interface 332 to manage a draft message. Such input can be provided to any other modules or functional blocks of app 310 as appropriate.

Draft handler 318 can perform operations to perform actions related to the draft, based on input received via application interface 332. One action can include storing a draft in a particular format (e.g., a particular type of message). Another action can include sending an invitation to one or more other users to collaborate on editing the draft message. In this case, the draft can be included in the invitation message. Yet another action can include sending the draft message to the designated recipient(s), using an account associated with a user operating client device 300. The account can be provided by message management service 104 or a messaging service. In some embodiments, draft handler 318 can send one or more instructions to message management service 104 to send the draft as a message. Message management service 200 can send the message via an account associated with the user of client 300. In some embodiments, draft handler 318 can send an instruction directly to a messaging service to send a draft message from an account provided by the messaging service.

It will be appreciated that client device 300 is illustrative and that variations and modifications are possible. The particular number and arrangement of functional blocks and modules are defined for convenience of description, and blocks can be modified or combined as desired. Further, different functional blocks can be implemented using the same hardware and/or software elements. Client app 310 can include other modules not expressly shown, e.g., to manage versions of a draft, to handle conflicts relating to edits made on different clients, to facilitate real-time collaborative drafting of a message, and/or to generate notifications to the user of activity by other authors based on information received from message management service 200.

To facilitate collaborative drafting of a message, it can be useful to associate metadata with the draft message. The metadata can include, e.g., identifiers of the various authors, permission levels for each author, identifiers and version information for the clients of the authors, and identifier(s) of the designated recipient(s) of the message. The metadata can be used, e.g., to facilitate synchronizing drafts across the authors' client devices, inviting users to collaborate on drafts, managing the collaboration process, sending drafts as messages, and so on. In some embodiments, metadata for draft messages can be stored in a data structure that can include the draft or a reference to a location where the draft is stored.

Figure 4:
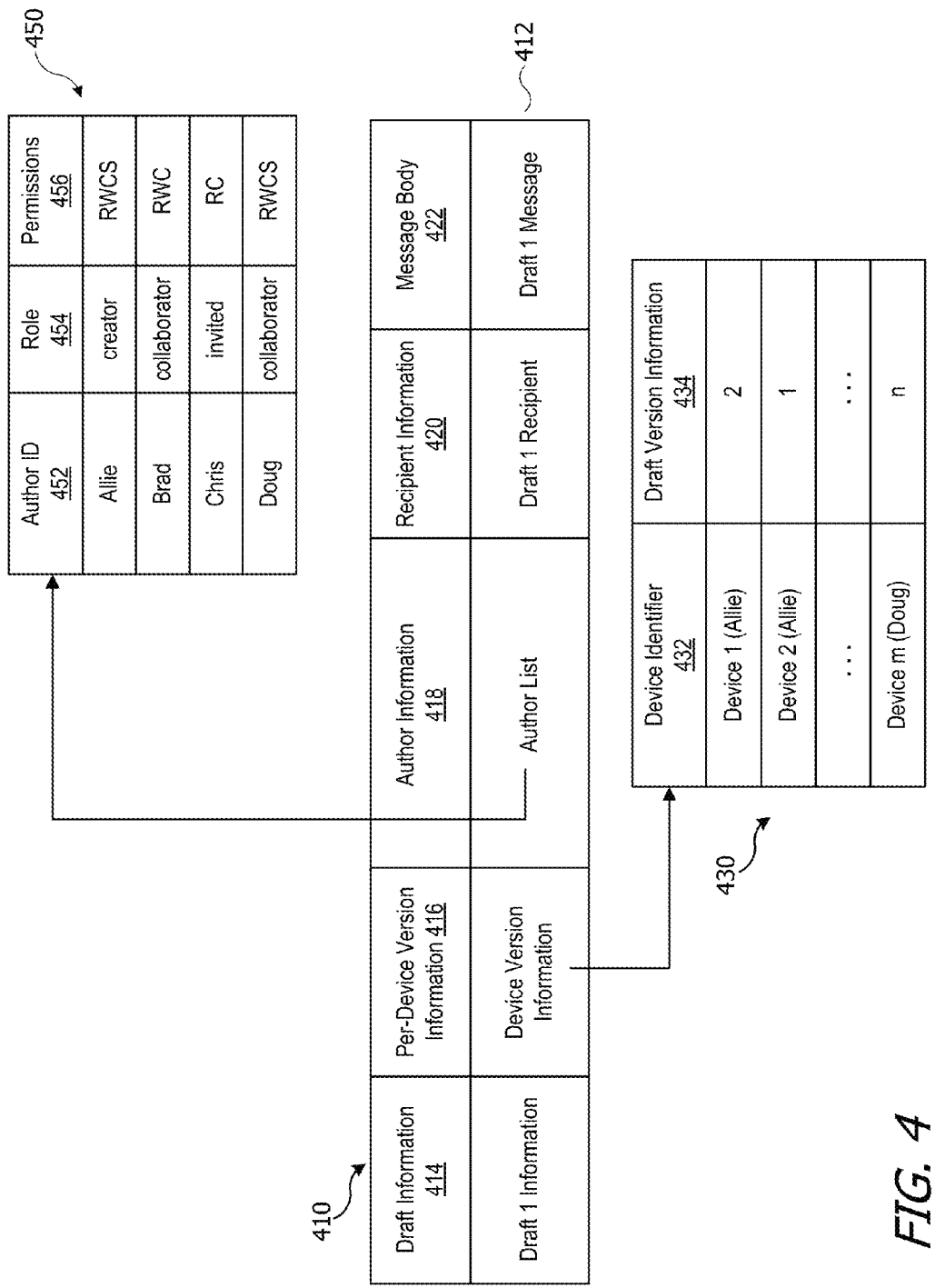
FIG. 4 shows examples of data structures for managing collaborative draft messages according to an embodiment of the present invention.

FIG. 4 shows examples of data structures for managing collaborative draft messages according to an embodiment of the present invention. Each of the data structures shown in FIG. 4 can be implemented using various structured-data representations, such as an array, a record, a hash table, a linked list, and so on. The data structures can be used by any of clients 108, 110. 202, 206, 300 and/or message management service 104, 200.

Data structure 410 can be used by a message management service, e.g., message management service 200, to manage the metadata for draft messages. For purposes of illustration, data structure 410 is shown as a table, with a row 412 corresponding to each draft that is being managed by message management service 104; other structures and formats can be substituted. Data structure 410 for a particular draft can include draft information 414, per-device version information 416, author information 418, recipient information 420, and message body 422.

Draft information 414 can include an identifier for the draft message (e.g., a serial number or other identifier assigned by the client that created the draft message) as well as other information such as an identifier of the client (or user) that created the draft, date and time of creation, whether the draft is a collaborative draft, etc.

Per-device information 416 can include information about the version of the draft on each client device that is participating in creation and editing of the draft. In some embodiments, any or all draft messages a particular user creates can be synchronized across various clients belonging to that user. Where a draft message is a collaborative draft (i.e., where multiple users are designated as authors), the draft can be also synchronized across any or all clients belonging to each of the authors. Table 430 shows an example of per-device information 416. In this example, table 430 includes an entry (row) for each client device for which the draft is to be synchronized. The entry identifies the device (column 432) and a draft version (column 434) that exists on that client device. For instance, as noted above, when a user creates or edits a draft message using a particular client device, that device can send the new or revised draft to message management service 200 along with version information for the draft, and message management service 200 can use the version information to keep track of the most current version, detect and resolve conflicts among versions on different clients (including clients belonging to different authors), and so on. In some embodiments, message management service 200 can use table 430 during a synchronization operation with a particular client device to determine whether the version of the draft message on that device needs to be updated.

Author information 418 can include information about the users who have been identified as authors on the draft message. As used herein, an "author" can include the creating user (i.e., the user who creates a collaborative draft) and one or more collaborating users, where each collaborating user is invited to collaborate by either the creating user or another collaborating user. To support collaboration, author information 418 can incorporate information about multiple authors (including the creating user and the collaborating user(s)). Table 450 shows an example of author information 418. In this example, table 450 includes an entry (row) for each author. The entry includes an author identifier 452, a role identifier 454, and permissions 456. Author identifier 452 can be, e.g., an email address or account identifier of the author. Role identifier 454 can indicate whether the user is the creating user, a collaborating user, or a user who has been invited to collaborate but has not responded to the invitation. Permissions 456 can indicate what operations a particular author is or is not allowed to perform on the draft. In the example shown, the permissions include: "read" permission (R), indicating that the author can view the draft; "write" permission (W), indicating that the author can modify the draft; "comment" permission (C), indicating that the user can add comments on the draft; and "send" permission (S), indicating that the user can send the draft. Other permissions can also be supported. For instance, some but not all authors might be granted permission to invite additional collaborators to join. In some embodiments, all authors have all permissions equally, and per-author permissions need not be expressly indicated. Express permission indicators can also be omitted if the permission is determined by the author's role.

Recipient information 420 can include information identifying one or more designated recipients of the draft message. For instance, recipient information 420 can include an email address of each recipient. In some embodiments, recipients can be designated as "To," "CC," and "BCC" recipients (per a standard email convention). Recipients can be designated by the creating user prior to inviting other users to collaborate. In some embodiments, some or all of the authors may have permission to edit recipient information 420 after the draft is created. When the message is sent, recipient information 420 can be used to populate the appropriate message header field(s).

Message body 422 can include the current version of the content of the message. In some embodiments, message body 422 can be implemented using a pointer or other reference to a location where the content is actually stored, rather than storing the actual content in data structure 410.

It will be appreciated that the data structures of FIG. 4 are illustrative and that variations and modifications are possible. The particular metadata elements and data structures can be altered. In some embodiments, a client can implement a similar data structure including some or all of the information shown, to facilitate synchronization between the client and the message management service. For instance, each client device can have a local copy of per-device version information table 430 and can update its local copy with information provided by the message management service when the message management service sends the client device an updated draft. When the client device updates its draft, the client device can increment its own version counter and send its (updated) local copy of table 430 to the message management service. By comparing the full set of version identifiers in the client's local copy to the copy stored at the message management service, the message management service can detect instances where a client's updates may be based on an outdated version of the document. This can result in detecting a conflict and instigating conflict resolution processes, e.g., as described in above-referenced U.S. application Ser. No. 14/552,166.

A client device can also maintain a local copy of author information table 450. This can be used by the client device, e.g., to enforce permissions. For instance, a client device that belongs to an author who does not have send permission can prevent its user from operating a "send" control in the user interface. A client device can also use author information table 450 to present a current list of authors on the draft message, to facilitate opening a secondary communication channel to one or more other authors (e.g., the client device can provide an option to open an instant messaging or video chat session with one or more other authors to facilitate real-time discussion of the draft), and so on.

To facilitate collaborative drafting of a message, a message management service (e.g., message management service 200) can provide synchronization of a draft message across clients, including clients belonging to different users. In addition, message management service 200 can facilitate detecting and resolving conflicts between versions of the draft that may exist on different clients, including clients belonging to different users. Examples of techniques for synchronizing drafts across client devices are described in above-referenced U.S. application Ser. No. 14/552,166, and it is to be understood that the same processes can be applied to client devices belonging to different users. Other processes can also be used to facilitate real-time collaboration. For example, existing or future processes that support real-time editorial collaboration on a document stored on a server can be adapted to support collaborative editing of message drafts when the authors are online (e.g., when their clients are connected to and in communication with message management service 200).

In some embodiments, user interaction with a collaborative draft can be managed through the same user interface that the user would use to create and send a single-author (non-collaborative) draft. A user can manage collaborative draft messages in the same manner as any other draft messages. For example, a message management service (e.g., message management service 200) can maintain a drafts folder for each user account. At any given time, the drafts folder can provide access to messages the user is in the process of drafting, e.g., by allowing the user to view a listing of all draft messages currently in the drafts folder and to select from the listing a specific draft message to view and edit. Accordingly, a user can begin drafting a message (either collaborative or non-collaborative) using a client app of the message management service, then decide to stop drafting for a time. When the user stops drafting, the draft can be saved by the message management service and made accessible to the user through the drafts folder. When the message is sent to the designated recipient(s), the draft message can be removed from the user's drafts folder. Collaborative drafts and non-collaborative drafts can be made available through the same drafts folder and managed similarly; for instance, a collaborative draft can be made available through the drafts folder of each author and can be automatically removed from the drafts folders of all authors upon sending the draft message to the recipient(s). Thus, in some embodiments, existing user interfaces can be enhanced to support various features of collaborative drafts. Examples will now be described.

Figure 5:
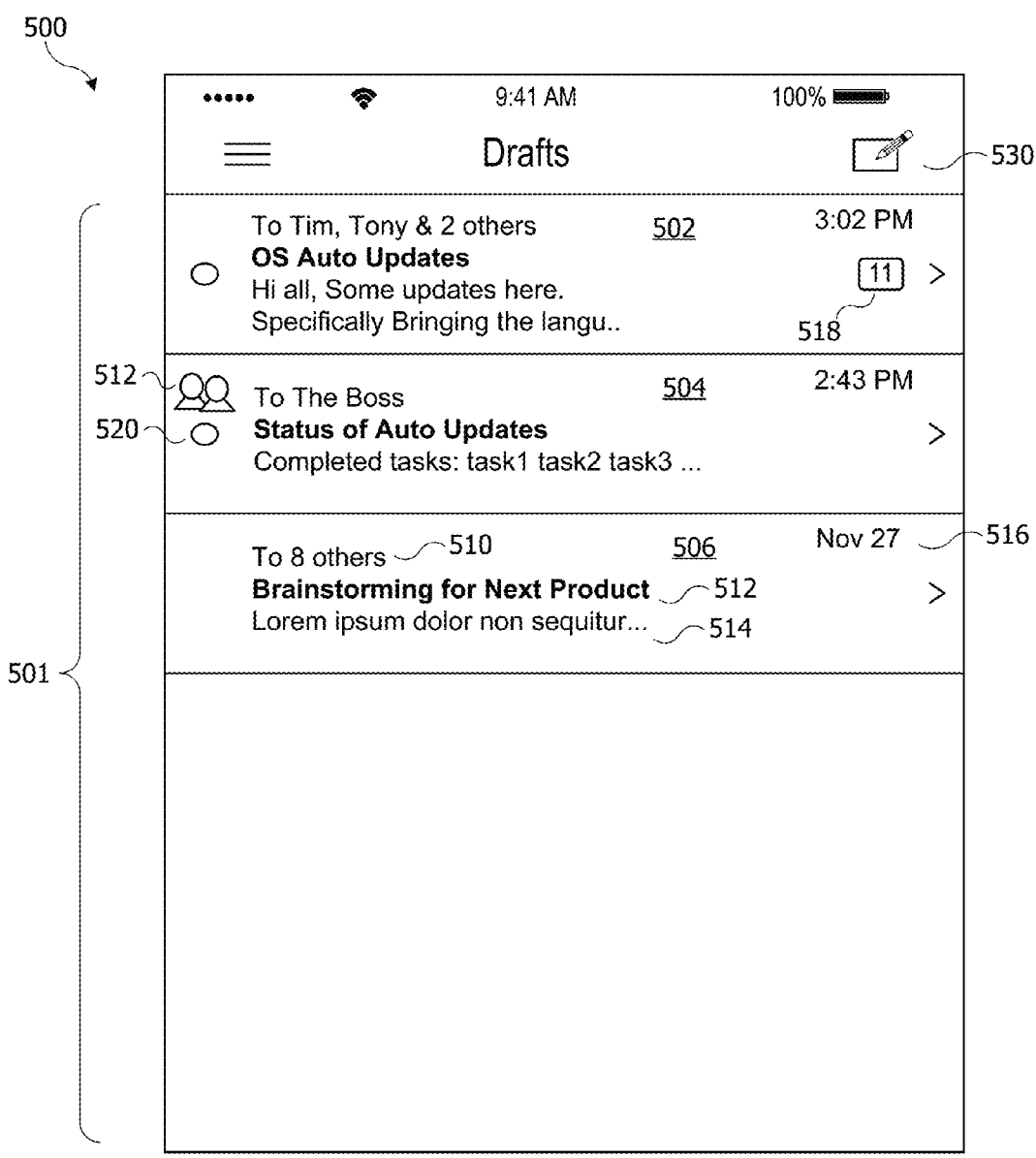
FIG. 5 shows a graphical user interface screen for a drafts folder according to an embodiment of the present invention.

FIG. 5 shows a graphical user interface screen 500 for a drafts folder according to an embodiment of the present invention. Screen 500, and all other user interface screens described herein, can be presented on a display device and can occupy all or a portion of the display area as desired. For instance, on a mobile device, screen 500 may occupy the entire display area, while on a larger device such as a desktop computer, screen 500 might occupy a portion of the display area. Screen 500, and all other user interface screens described herein, can be used in a touch-screen interface, where the user provides input by making gestures (e.g., tap, swipe, drag) using one or more fingers (or other objects) in contact with the display screen in order to select displayed elements or perform operations on displayed elements. Alternatively, a cursor-based graphical user interface can be supported, in which the user operates a pointing device to position a cursor over an element and performs a button press (or click) operation or the like to select the element.

Screen 500 can present a list 501 of draft messages 502, 504, 506 that the user has previously created or become a collaborator on. The draft messages can include messages that have been created but not yet sent. For each draft, e.g., draft message 506, list 501 can present a preview representation that can include "to" information 510 identifying the designated recipient(s), subject line 512, and content preview 514, which can include a portion of the message content. It should be noted that for a draft message, some or all of this information may not be present, and the preview representation can be modified with placeholders to indicate the absence of information. For instance, if a subject line has not been provided, subject line 512 can indicate "(no subject)" or be blank. Timestamp 516 can indicate when the draft was created or when it was last edited.

In some embodiments, some or all draft messages can be replies (or forwards) in an ongoing exchange of messages. For example, draft message 502 includes a numerical badge 518 indicating that there are 11 previous messages in the thread.

Some or all of the draft messages can be collaborative drafts. For example, draft message 504 is a collaborative draft, as indicated by collaboration icon 512. In some embodiments, the client device can determine whether to display collaboration icon 512 for a particular draft based on author information 450 associated with the draft. If there is only one author (presumably the user to whom the client device belongs), then the draft is not collaborative; if there are multiple authors, then it is. Other techniques can also be used to determine whether a draft is a collaborative draft, and it is not required that a collaborative draft be visually identified as such.

Activity icon 520 can indicate various activity related to the draft. For instance, in the case of collaborative draft 504, icon 520 can be used to indicate whether the user has or has not viewed draft 504, whether draft 504 has been updated (e.g., by another author editing the draft) since the last time the user looked at it, or whether anyone else is currently editing draft 504. In some embodiments, different possible activity states can be indicated using color coding, different icons, or the like. For instance, activity icon 520 can be a blue circle if the user has not yet viewed draft 504, a yellow circle if an update by another author has occurred since the user last viewed draft 504, and a red circle if another user is currently editing draft 504.

While viewing screen 500, a user can select a draft to view and edit, e.g., by tapping or clicking on the corresponding entry in list 501. Alternatively, a user (referred to as a "creating user") can initiate creation of a new draft by selecting "compose" control element 530.

Figure 6:
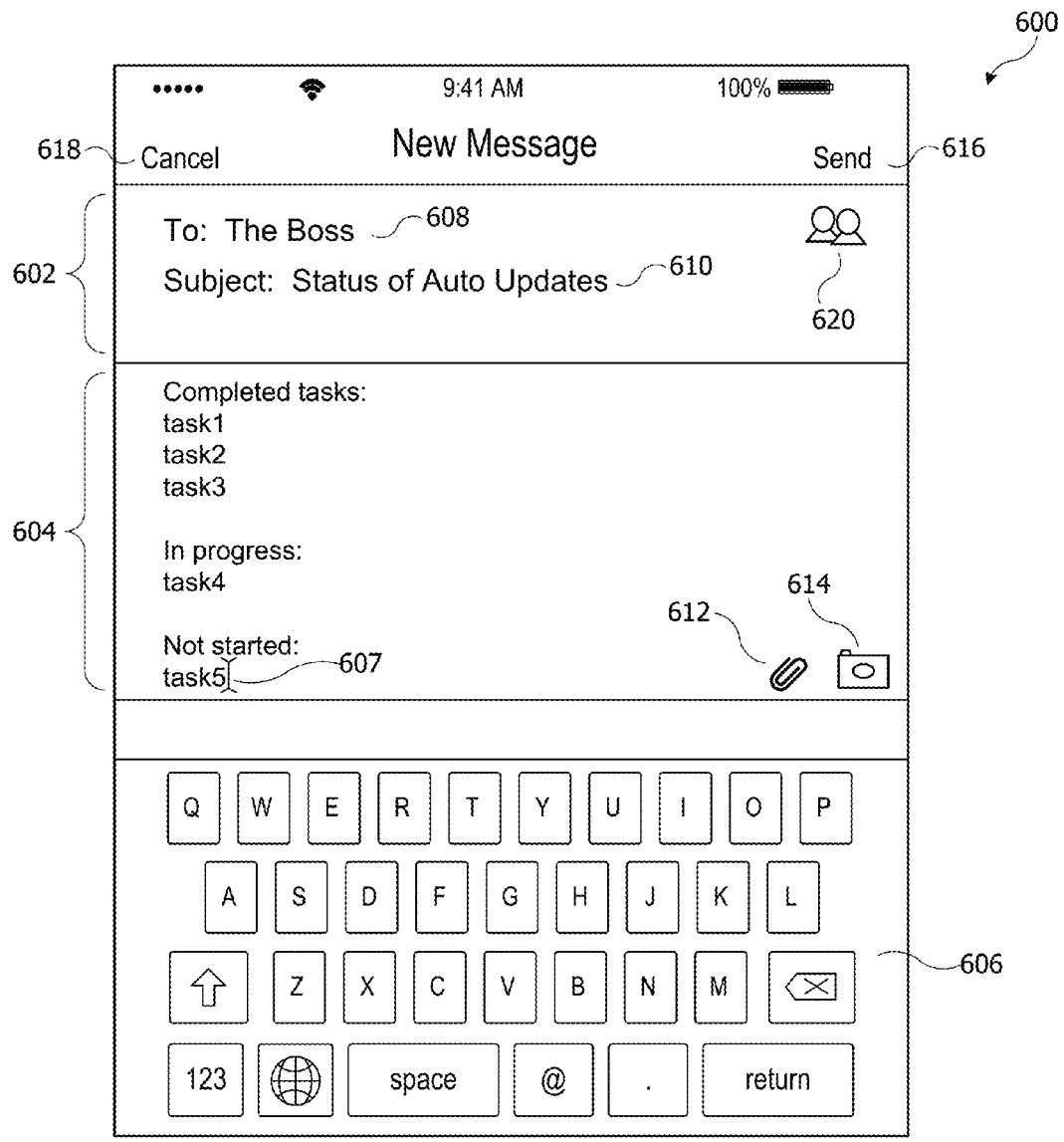
FIG. 6 shows a graphical user interface screen for composing a message according to an embodiment of the present invention.

FIG. 6 shows a graphical user interface screen 600 for composing a message according to an embodiment of the present invention. Screen 600 can be presented in response to the creating user selecting control element 530 from screen 500 or otherwise indicating a desire to create a message (e.g., by selecting a "reply" option while viewing a received message).

Screen 600 provides a header region 602, a content region 604, and a virtual keyboard 606. (For clients that include a physical keyboard, speech-to-text converter, or other input device, virtual keyboard 606 can be omitted.) The user can position a cursor element 607 in header region 602 or composition region 604 and type on virtual keyboard 606 to add information to the draft. For example, the user can populate "To" field 608 with one or more recipient identifiers and "Subject" field 610 with a subject line. In some embodiments, the user may be able to access a contacts list (e.g., address book) and/or exploit an autocompletion feature of the client app to facilitate identifying recipients. Additional options for designating recipients (e.g., "CC" and/or "BCC" fields) can also be provided. The user can operate control 612 to attach a document to the message or control 614 to take and attach a photo using a camera controlled by the client device. The user can operate "send" control element 616 to send the message and "cancel" control element 618 to cancel the drafting operation. Upon cancelling, the user can be prompted to save or discard the draft. In these respects, screen 600 can be similar to conventional message composition interfaces.

In this example, the creating user is initially identified as the sole author on the draft. (A draft with one author is sometimes referred to herein as a "solo draft," to distinguish from a "collaborative draft," which has at least two authors.) Screen 600 also includes a control element 620 that can be used to initiate a collaborative draft. Control element 620 can be selected at any time while the user is composing or editing a solo draft.

Figure 7:
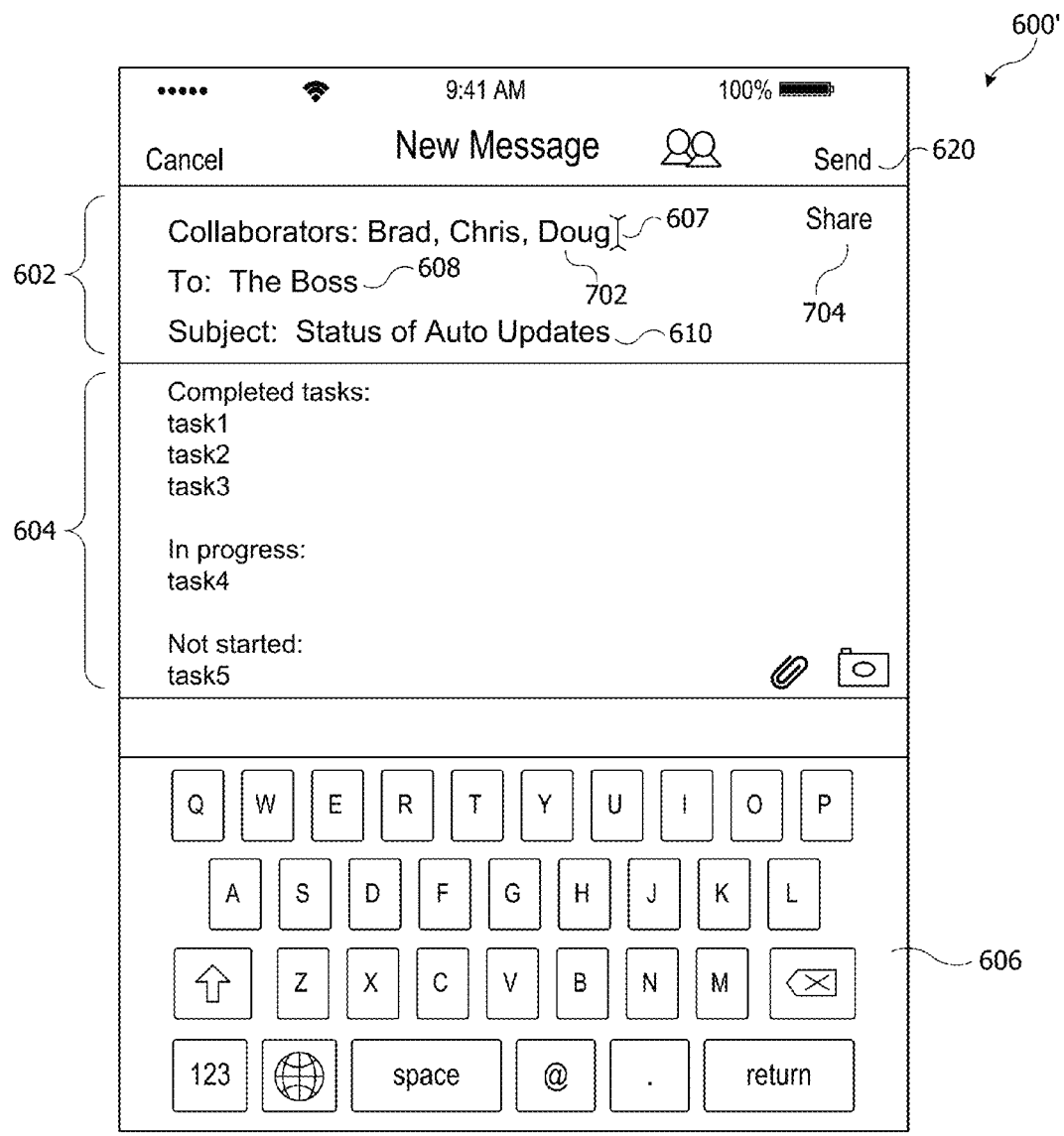
FIG. 7 shows a graphical user interface screen for initiating a collaborative draft according to an embodiment of the present invention.

FIG. 7 shows a graphical user interface screen 600' that corresponds to screen 600 after the creating user selects control element 620 to initiate a collaborative draft. Header region 602 now includes a "Collaborators" field 702, which the creating user can populate with identifiers (e.g., email addresses) of one or more other users who are to be invited to collaborate on the draft. Upon selection of control element 620 from screen 600, cursor element 607 can be automatically positioned in Collaborators field 702 so that the creating user can identify the collaborating users. In some embodiments, the interface can allow the creating user to establish permissions for the collaborating users, e.g., as described above with reference to FIG. 4. For instance, the interface can allow the user to select the name of a collaborating user and open a pop-up menu of permission options for that user. Default permissions can be predefined (e.g., all collaborators have all permissions), so that the creating user need not manually change the permissions unless the default is not acceptable. Header region 602 also now includes a "share" element 704 that the creating user can select when ready to share the draft with the collaborating users identified using field 702.

A creating user can decide to initiate a collaborative draft at any time while drafting a message. For example, immediately upon reaching screen 600 of FIG. 6, the user can select control 620 prior to entering any information. Alternatively, after entering some information into header region 602 and/or content region 604, the user can decide that the draft should be collaborative and can select control 620 upon making that decision without having to cancel and re-create the draft.

In some embodiments, the collaborative draft is not shared with the collaborating users designated in field 702 until the creating user selects "share" element 704 to initiate sharing. Thus, the creating user can edit the draft into a desired state prior to showing it to anyone else.

When the creating user initiates sharing (e.g., by selecting element 704), the draft can be provided as a new collaborative draft to a message management service, e.g., message management service 200. Message management service 200 can create (or update) a record for the draft (e.g., using the data structures of FIG. 4) and can generate an invitation message to each collaborating user. The invitation message can include some or all of the content and/or metadata of the draft. In some embodiments, message management service 200 can add the new collaborative draft to a drafts folder of each collaborating user, in which case the collaborating user can see the draft in a screen similar to screen 500 of FIG. 5. However, users might not routinely check their drafts folders for new collaborative drafts, so it may be desirable to expressly notify the user of a new collaborative draft, e.g., by delivering a collaborative-draft invitation into the collaborating user's inbox prior to (or concurrently with) adding the draft to the drafts folder.

Figure 8:
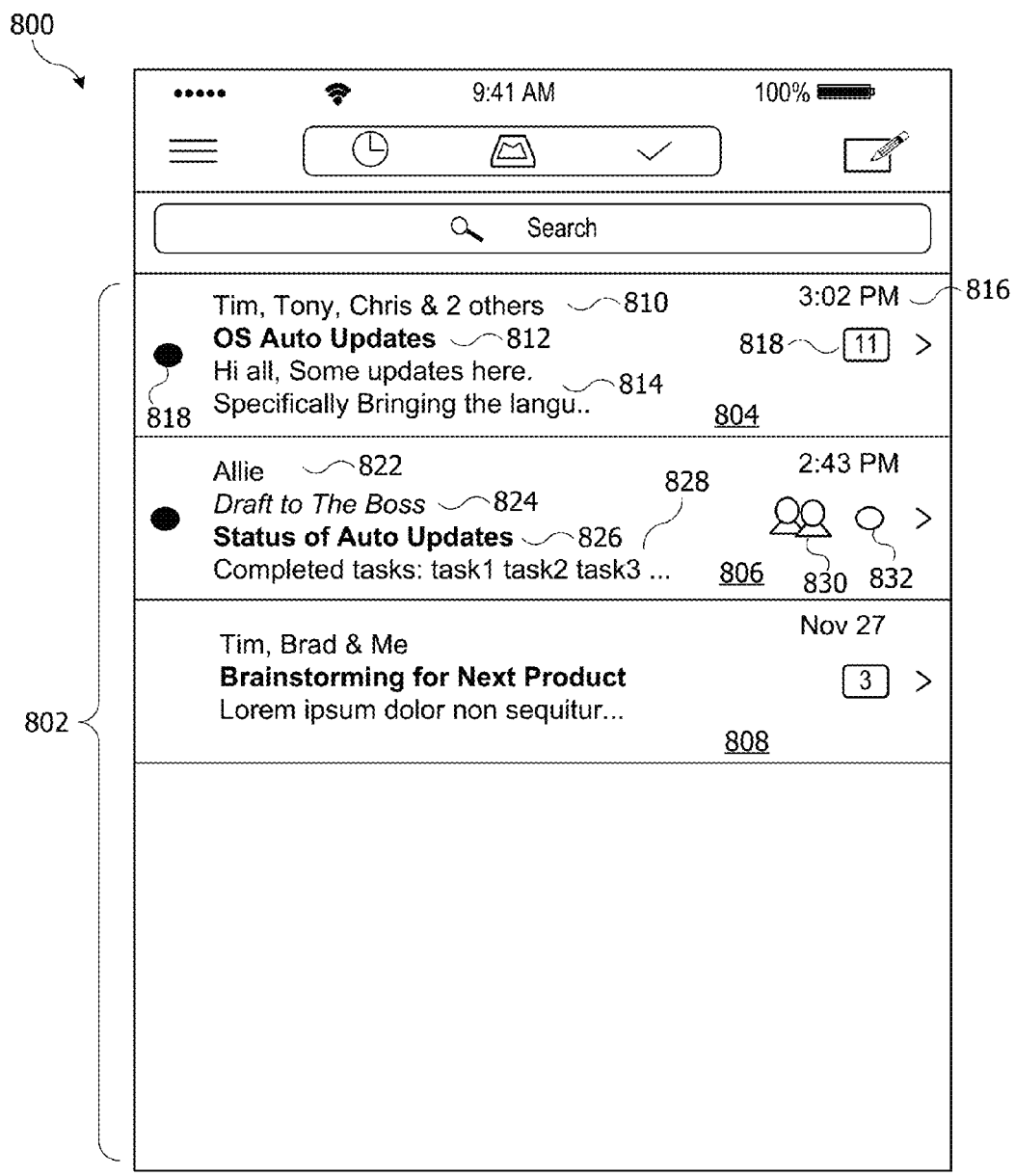
FIG. 8 shows a user interface screen for a user's inbox with a collaborative-draft invitation according to an embodiment of the present invention.

FIG. 8 shows a user interface screen 800 for a user's inbox with a collaborative-draft invitation according to an embodiment of the present invention. Screen 800 can include a list 802 of messages 804, 806, 808 received by the collaborating user. List 802 can represent a user's "inbox," meaning a location where new messages are presented for the user to view and respond. Messages can remain in the inbox until the user takes action (e.g., moving them to a different message collection, deleting, responding, etc.). For each message, e.g., message 804, list 802 can present a preview representation that can include "from" information 810 identifying the sender(s) of message 804, subject line 812, and content preview 814, which can include a portion of the message content. Timestamp 816 can indicate when the message was received. Unread message indicator 818 can identify messages the user has not yet read.

In some embodiments, some of the messages can be part of a thread of related messages, and list 802 can include one representative message for each thread (e.g., the most recently received message). For instance, message 804 includes counter badge 818 indicating that it is part of a thread.

Message 806 is an example of an invitation message for a collaborative draft according to an embodiment of the present invention. The representation of message 806 in list 802 can include various visual indicia to make it recognizable as an invitation to participate in a collaborative draft. For example, sender line 822 can identify the sender of the invitation (e.g., the creating user). Draft indicator line 824 can indicate that the message is actually a draft and identify the designated recipient(s). Subject line 826 and content preview 828 can include portions of draft content provided by the creating user, or they can be placeholders if the creating user did not populate these fields prior to sharing the draft. Collaboration icon 830 can be provided as a further indicator that this is an invitation to collaborate on a draft, and activity icon 832 can indicate information about the current status of the draft (e.g., whether another user has edited it after the invitation was sent). The user can open invitation message 806 in the same manner as any other message, e.g., by tapping or clicking on it. The user can also move invitation message 806 to another message collection (e.g., a deferred collection for later review, a to-do list, an archive collection) or delete it.

Figure 9:
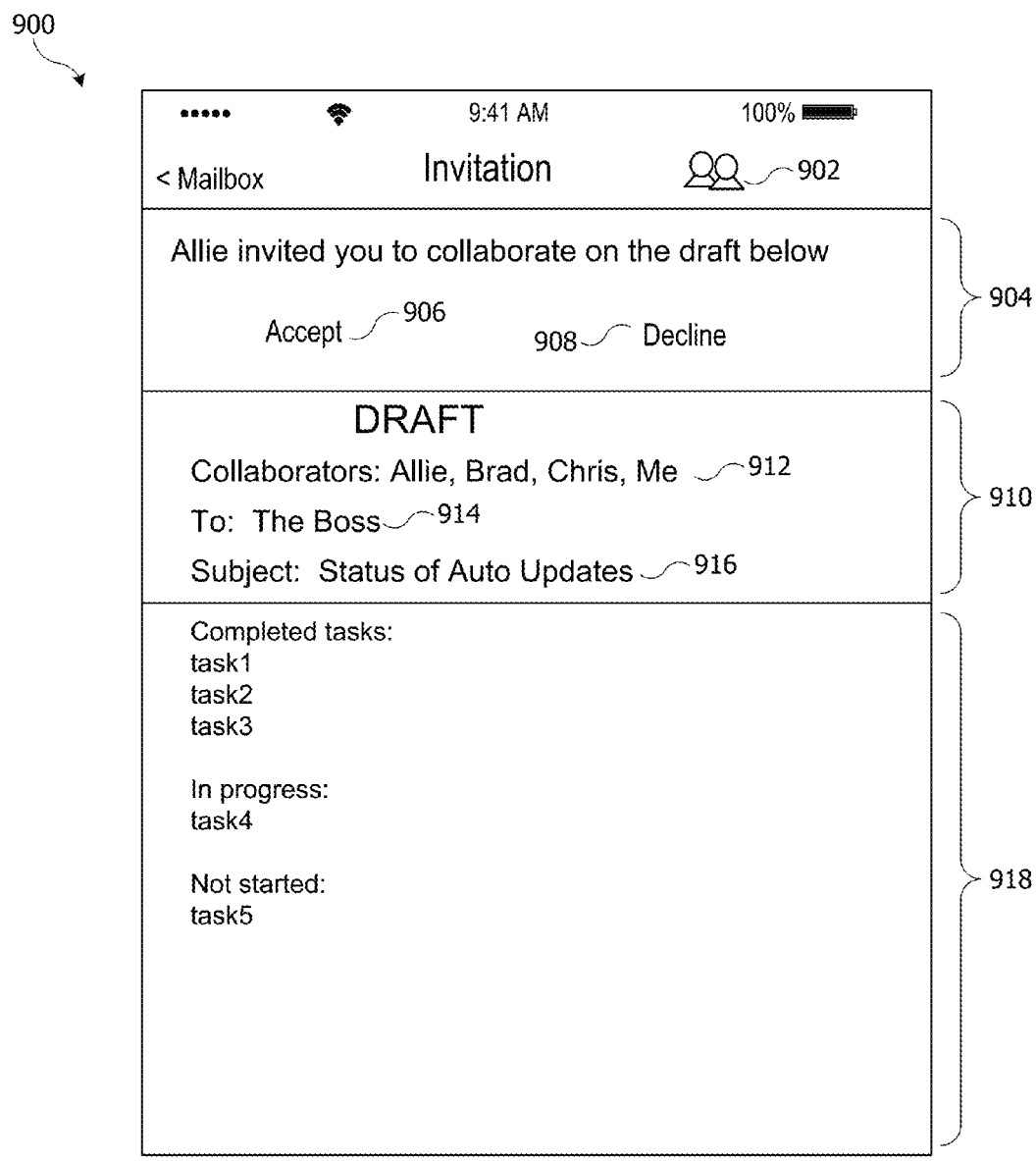
FIG. 9 shows a user interface screen presenting an invitation according to an embodiment of the present invention.

FIG. 9 shows a user interface screen 900 presenting an invitation according to an embodiment of the present invention. Screen 900 can be presented, e.g., if the invited user opens invitation message 806 from list 800 of FIG. 8. Screen 900 can include a distinctive header bar that includes collaboration icon 902, indicating that the user is being invited to collaborate on a draft. Invitation region 904 can include an introductory line identifying the creating user (or the user who issued the invitation) and optionally additional comments provided by the creating user. Control element 906 can be operable by the invited user to accept the invitation, and control element 908 can be operable by the invited user to decline the invitation. Selecting either control element 906 or control element 908 can result in the client sending a notification to message management service 200 indicating whether the invited user has accepted or declined the invitation. Message management service 200 can update author information table 450 (FIG. 4) accordingly. For instance, if an invited user accepts an invitation, author information 450 table can be updated to change the user's role from "invited" to "collaborating," and if the user declines, the user can be removed from author information table 450 or identified as "declined." In some embodiments, message management service 200 can also notify the creating user and/or any other collaborating users (e.g., by sending notifications or other messages to their client devices) when a user accepts or declines an invitation to collaborate.

Region 910 of screen 900 can show header information for the draft. The information can include a list of collaborators 912, identifier(s) of the intended recipient(s) 914 (which in some embodiments can include a "To" line as shown, a "CC" line and a "BCC" line), and a subject line 916. In some embodiments, collaborators line 912 can indicate each collaborator's status, such as which collaborators have accepted or declined invitations. Status of a collaborator can be indicated using distinctive fonts, font colors, font sizes, highlighting, icons, or other visual indicia as desired. Region 918 can present the current content of the draft message, which can be the content as it existed when the invitation was sent or a current snapshot of the content at the time the invited user opens the invitation, which can be created, e.g., by retrieving the current draft from message management service 200 in response to the user opening the invitation. This information can be reviewed by the invited user prior to accepting or declining the invitation to collaborate. If the invited user declines, the invitation message can be automatically deleted from the invited user's inbox or moved to an archive folder.

Figure 10:
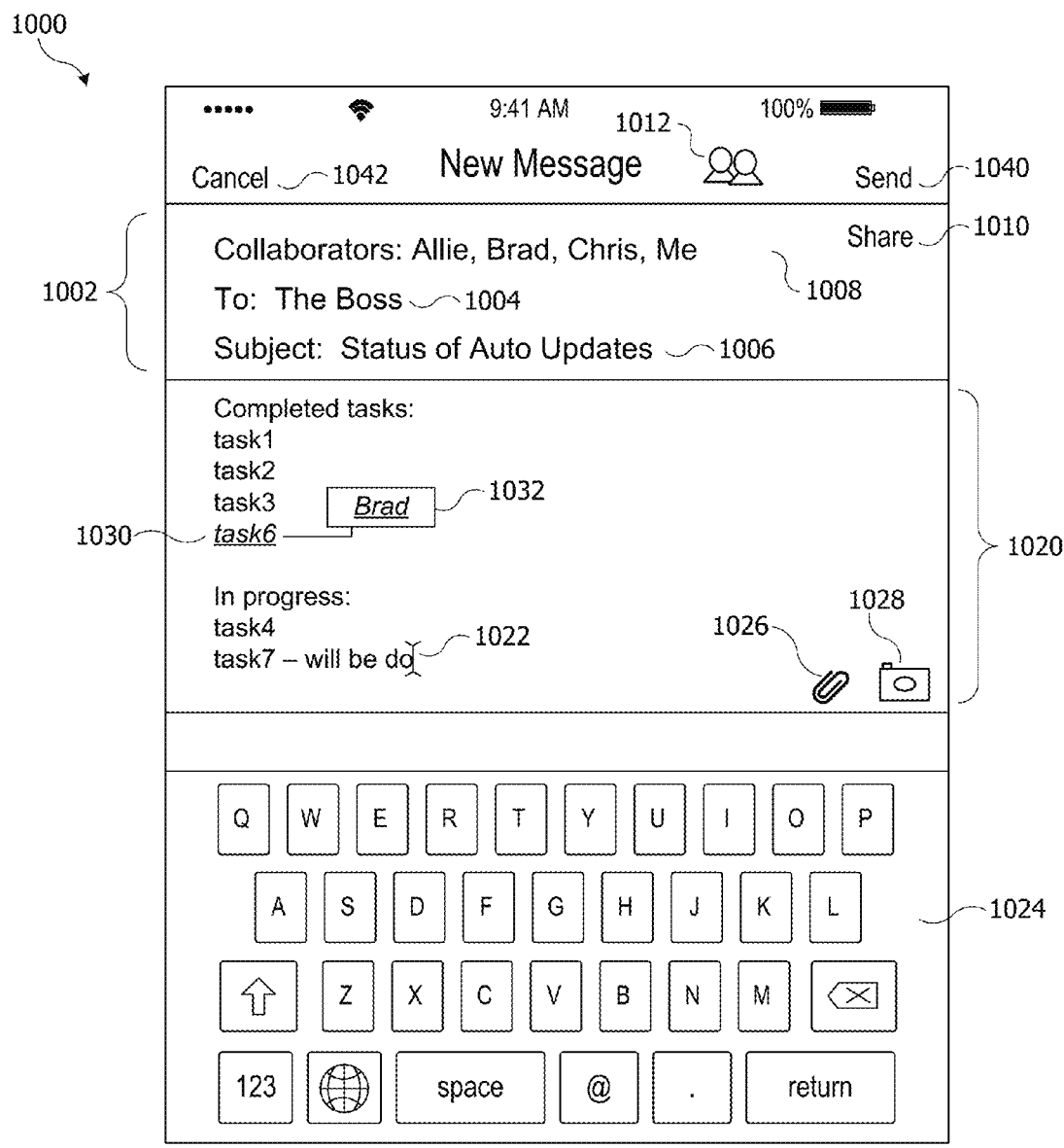
FIG. 10 shows a user interface screen 1000 for collaborative editing of a draft message according to an embodiment of the present invention.

If the invited user accepts the invitation, the invited user becomes a collaborating user and can be allowed to edit the draft message. FIG. 10 shows a user interface screen 1000 for collaborative editing of a draft message according to an embodiment of the present invention. Interface screen 1000 can support concurrent editing by multiple authors.

Interface screen 1000 can provide a user interface for composing and editing messages that can be, in most respects, identical to interface screens 600 (FIG. 6) and 600' (FIG. 7). For example, header region 1002 can include message headers such as "To" line 1004 and "Subject" line 1006. In some embodiments, these lines can be editable by any collaborating user. "Collaborators" line 1008 can list the current collaborators. In some embodiments, collaborators line 1008 can show additional status information, such as indicating which authors are currently editing the draft, which authors have or have not accepted invitations, etc. Status information can be indicated using distinctive fonts, font colors, font sizes, highlighting, icons, or other visual indicia as desired. In some embodiments, a collaborating user may be able to invite additional collaborators, e.g., by typing their names, addresses, or other identifiers in "Collaborators" line 1008 and operating "Share" control element 1010. Icon 1012 can be incorporated to indicate that this is a collaborative draft.

Editing region 1020 present an editable representation of the message content. A user viewing screen 1000 can edit the message content by positioning a cursor 1022 at the desired location and typing on virtual keyboard 1024. (In some embodiments, a physical keyboard or other input device can be used instead of virtual keyboard 1024.) Attachment control 1026 can be operated by the user to attach a file, and camera control 1028 can be operated by the user to take and attach a photo using a camera function of the user's client device. In some embodiments, all authors can view an interface screen similar or identical to screen 1000.

In some embodiments, screen 1000 can support real-time collaboration among authors. For instance, if other authors are also editing the draft, their edits can be shown in real time on screen 1000. For instance, at location 1030, it is indicated that collaborator Brad is typing the text "task6" while the user viewing screen 1000 is typing at the location of cursor 1022. Each author's edits can be shown in a distinctive font or color (underlining and italics are used in FIG. 10, but other distinguishing characteristics can be used), and callouts such as callout 1032 can identify which author is making the edits. Conventional or other techniques for communicating edits and updates to a document between devices in real time can be used.

In some embodiments, other real-time collaborative-editing features can also be supported. For instance, an author may be able to insert comments into the draft that are visible to other authors, who can review and respond, but that are not included in the final message as sent. Some interfaces can provide an interactive chat feature to allow authors to chat with each other about the draft while they are editing, and so on.

In some embodiments, in addition to or instead of real-time collaborative editing, screen 1000 can allow a user to make edits in a non-real-time mode and to choose when to share the edits and updates with other authors. For example, an author operating in non-real-time mode can operate "Share" control 1010 to send an updated version of the draft to message management service 200 with an instruction to propagate the update to all other authors.

Send control 1040 can be operated by the user to send the message to the designated recipient(s) (e.g., the user(s) identified in "To" line 1004). In some embodiments, any author can send the message at any time. In some embodiments, only authors who have been granted send permission can send the message, and control 1040 can be grayed out or otherwise indicated as being inoperative if the author using screen 1000 does not have permission to send the message. It is to be understood that the authors of a collaborative message can agree among themselves as to who will send the message and when, with or without a formal permission mechanism.

Screen 1000 can be presented to any author who is editing the draft. If the author wants to exit the editing process, the author can use "Cancel" control 1042. In some embodiments, if the author has made changes that have not been shared when control 1042 is operated, the author can be prompted to share the changes with the other authors.

A collaborative draft message can be made accessible to each author via that author's drafts folder, e.g., in the manner shown in FIG. 5. An author can return to editing the draft (or reviewing edits made by other authors) at any time by navigating to the drafts folder and selecting the draft. Thus, the overall user experience of editing a collaborative draft can be nearly identical to drafting of a solo (non-collaborative) message, except that a collaborative draft can be edited by multiple authors. Thus, there is no need for any of the authors to master another work flow or editor in connection with collaborative messages.

When a collaborative message is sent, the message headers and/or message body can be modified to indicate that the message has multiple authors. FIGS. 11A and 11B show pseudocode examples of incorporating identifiers of multiple authors into an email message according to an embodiment of the present invention. These techniques can be adapted to other types of messages, and the invention is not limited to email.

FIG. 11A shows an option that can be used to give the message a different appearance depending on whether the recipient is or is not a user of the message management service. Headers 1102 can be standard email headers, e.g., as specified in Internet Engineering Task Force (IETF) RFC 5322. "Sender" header 1103 and "From" header 1104 can be populated with an identifier of the author who actually sent the message (e.g., the user who operated send control 1040. Header 1106 can be a custom header that is recognized by client apps provided by message management service 200 and ignored by other email clients. Header 1106 can include identifiers of all the authors. If the recipient uses a client app provided by message management service 200, the recipient's client app can read header 1106 and present the message in a manner that identifies the multiple authors; an example is shown below.

In some embodiments, body portion 1110 of the email can be modified to include conditionally displayed content 1112 that can be displayed by email clients other than a client app provided by message management service 200. Content 1112 can include identifiers of the authors of the message, e.g., in a line of message text. Additional information, such as a recommendation to use message management service 200, can also be included in content 1112. Content 1112 can be suppressed if the client app is provided by message management service 200, where header 1106 provides the author information.

FIG. 11B shows another option that can be used to provide author information to email clients, although the displayed result may still depend on the email client. In this example, "From" header 1150 can exploit the IETF RFC 5322 email standard, which specifies that the "From" header can include multiple email addresses. In some embodiments, the recipient's email client can present the multiple addresses. In some embodiments, the recipient's email client can use the recipient's contact information or other available information to convert the email addresses to more readily recognizable names. Other options or combinations thereof can also be used.

Figure 12:
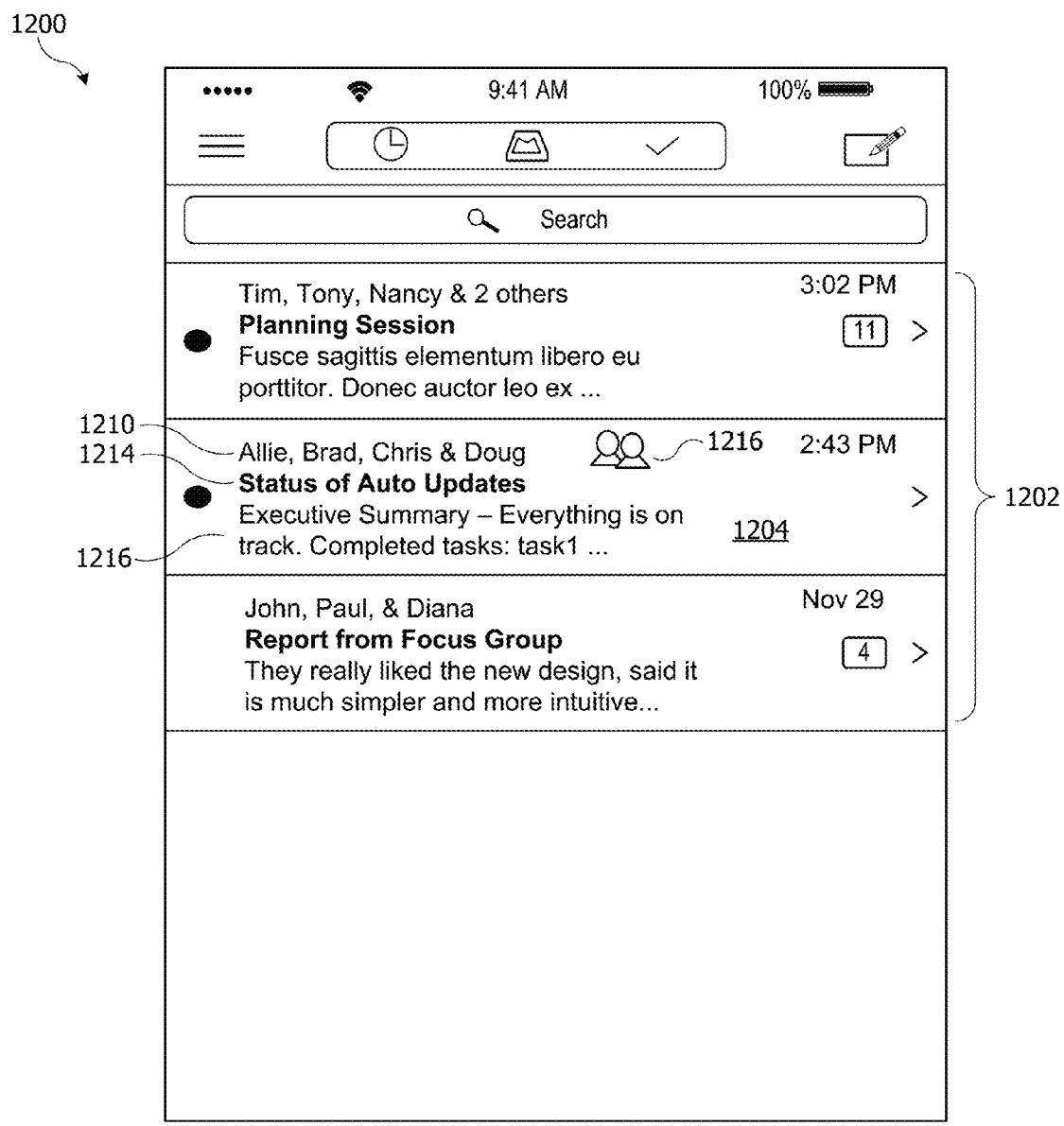
FIG. 12 shows a user interface screen for a client app provided by message management service according to an embodiment of the present invention.

A recipient's email client can indicate (e.g., using visual indicia) that a particular received message is a collaborative message resulting from a collaborative draft message. FIG. 12 shows a user interface screen 1200 for a client app provided by message management service 200 according to an embodiment of the present invention. Screen 1200 can be an interface to an email inbox and can be generally similar to inbox screen 800 described above. For instance, list 1202 can be generally similar to list 802 described above. List 1202 can include message 1204, which in this example is a collaborative message from multiple authors. The authors can be listed in "From" line 1210, the subject in line 1212, and a content preview in lines 1214. In some embodiments, an icon 1216 can be included next to the author names to further indicate that the message is from multiple authors. The recipient's client app can determine whether a message is a collaborative message in various ways and can present the visual indicia based on to that determination. For instance, the presence of multiple addresses in the "From" header (e.g., as shown in FIG. 11B) can indicate a collaborative message, or the presence of custom headers indicating collaborating authors (e.g., as shown in FIG. 11A) can indicate a collaborative message.

Figure 13:
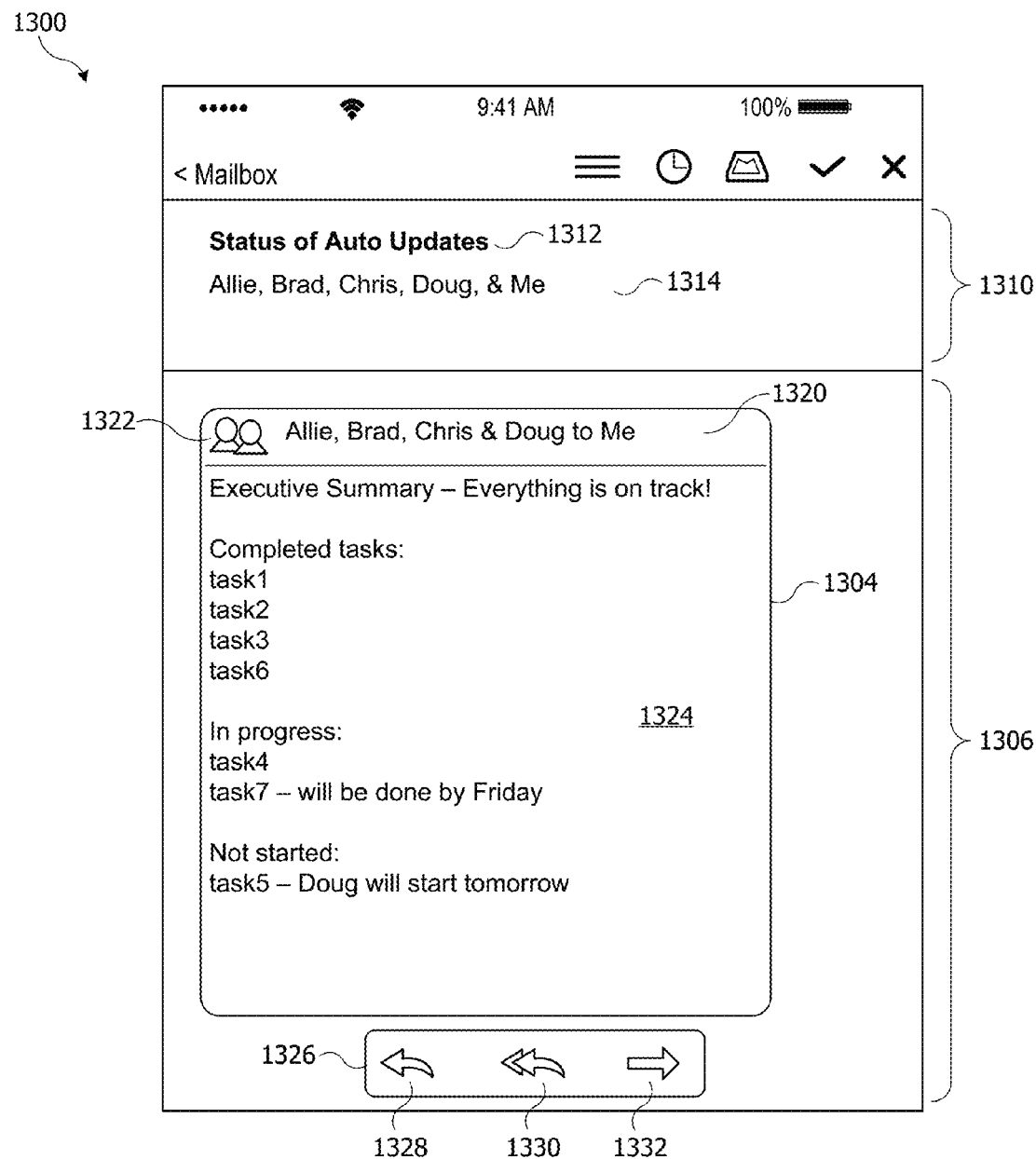
FIG. 13 shows a user interface screen displaying a message according to an embodiment of the present invention.

The recipient user can view message 1204, e.g., by tapping or clicking on it. FIG. 13 shows a user interface screen 1300 displaying a message according to an embodiment of the present invention. Screen 1300 can be displayed, e.g., when the recipient user selects message 1204 from list 1202 of FIG. 12. Screen 1300 can show message 1304 (the full content corresponding to message 1204 of FIG. 12) in a "conversation" view, such that if message 1304 is part of a thread of messages, other messages in the thread can also be viewed, e.g., by vertically scrolling region 1306 of screen 1300.

Header region 1310 can present the subject 1312 of the conversation and participant list 1314. In some embodiments, participant list 1314 can include all senders of one or more messages in the conversation (including all authors of message 1304), or participant list 1314 can include anyone who is a sender or recipient of at least one message in the conversation.

Message 1304 can include a participant list 1320 identifying the senders and recipients of that specific message. Since message 1304 is a collaborative message, all the authors can be listed. In some embodiments, icon 1322 can be used to further indicate that the message is a collaborative message. Message area 1324 can display the content of message 1304. In some embodiments, the displayed content in a conversation view can include just the substantive contribution of message 1304 to the conversation; for instance, headers, signature blocks, and/or blocks of quoted text from previous messages in the thread (if any) can be hidden or removed. Controls 1326 can be operable by the recipient to reply to the sender (control 1328), reply to all authors and recipients (control 1330), or forward the message (control 1332). In some embodiments, replying to the sender of a collaborative message results in composing a message to all of the authors, not just the one who sent the message.

It will be appreciated that the user interface images are illustrative and that variations and modifications are possible. The particular design and arrangement of interface elements can be varied as desired.

Figure 14:
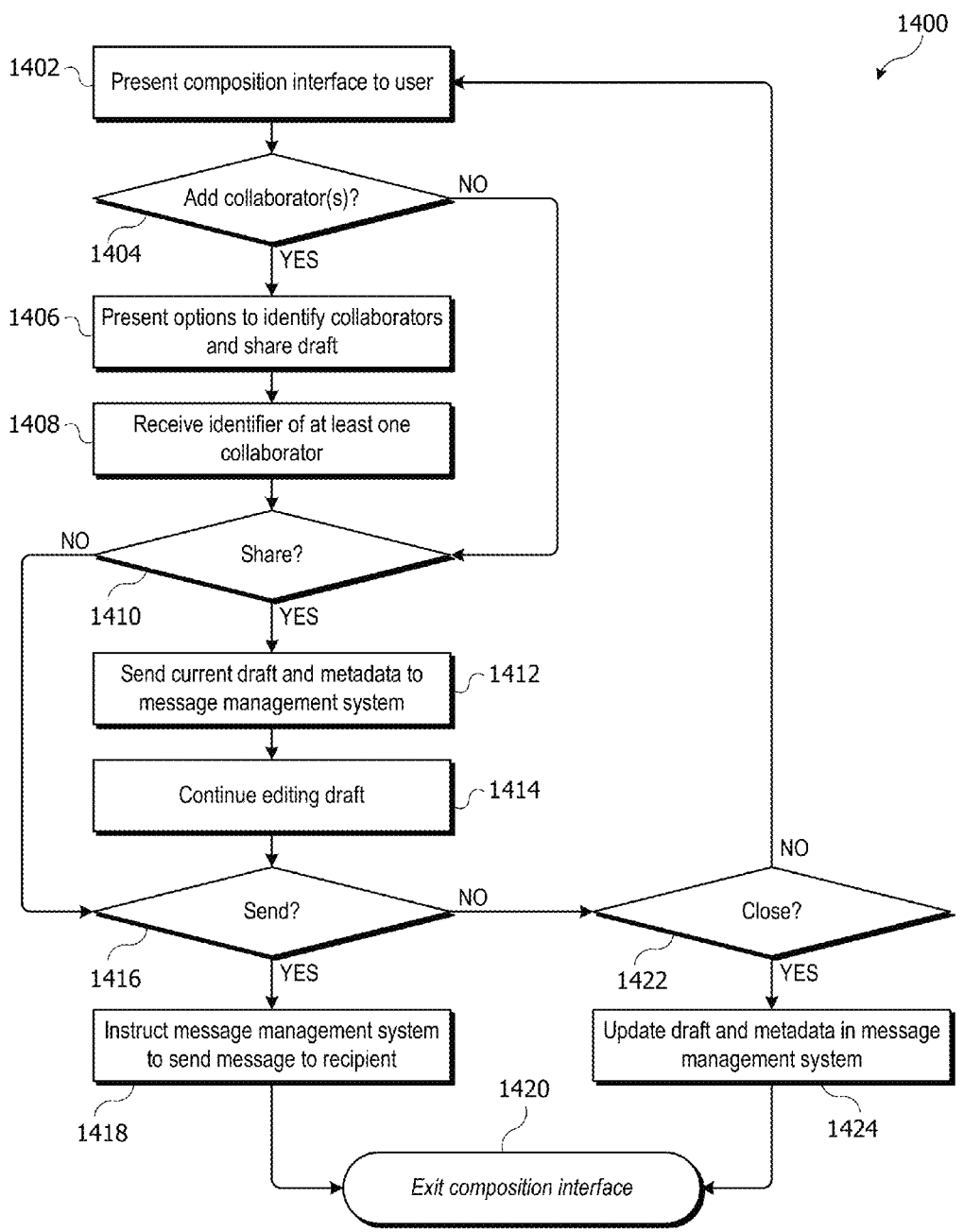
FIG. 14 is a flow diagram of a process for creating and editing a collaborative draft message according to an embodiment of the present invention.

The user experience can be implemented using various processes on a client (e.g., client 202 or 206 of FIG. 2) and a server (e.g., message management service 200). FIG. 14 is a flow diagram of a process 1400 for creating and editing a collaborative draft message according to an embodiment of the present invention. Process 1400 can be implemented on a client device, e.g., client 202 of FIG. 2, that executes a client app to communicate with a server of a message management service, e.g., message management service 200.

Process 1400 can begin when a user of client 202 (the creating user in this example) initiates composition of a message, e.g., by operating control 530 in interface screen 500 of FIG. 5. At block 1402, client 202 can present a composition interface (e.g., screen 600 of FIG. 6) to the creating user. At this point, the creating user can begin drafting the message (e.g., designating one or more recipients, creating content, editing content, adding attachments, etc.). At any point during drafting, the creating user may indicate a desire to add collaborating users, e.g., by operating control 620 of screen 600 FIG. 6.

If, at block 1404, the creating user indicates a desire to add collaborating users, then at block 1406, client 202 can present options to the creating user to identify collaborating users and to share the draft with the collaborating users. For instance, as described above, operating control 620 of screen 600 of FIG. 6 can result in client 202 presenting screen 600' of FIG. 7, which includes collaborators field 702 and "share" control element 704. At block 1408, the creating user can input identifier(s) of one or more collaborating users. For example, the creating user can type email addresses in collaborators field 702, or the user can type names that can be looked up by the client in a contacts list to identify corresponding addresses. In some embodiments, the creating user may also be able to define permissions for the collaborating user(s), e.g., read, write, comment, and send permissions as described above. For instance, the user can select a collaborator name and open a menu that allows the user to specify permissions for that collaborator. In some embodiments, a default set of permissions is automatically assigned to each collaborator, and the creating user can override the default via a menu or other interface.

At any point after identifying one or more collaborating users, the creating user can indicate that the draft should be shared with the collaborating user(s), e.g., by operating "share" control element 704. If, at block 1410, the creating user indicates that the draft should be shared, then at block 1412, client 202 can send the current version of the draft and associated metadata to message management service 200. The current version of the draft can include the content as it exists at the time when sharing is indicated. The associated metadata can include, e.g., version information and author information (e.g., as described above with reference to FIG. 4). Message management service 200 can use this information to issue invitations to the collaborating users and to synchronize the draft among users who accept the invitations. Examples of these processes are described below.

After sharing the draft, the creating user can continue to edit the draft at block 1414. The collaborating users who accept their invitations can also edit the draft using their own clients (e.g., client 206). In some embodiments, multiple authors (including the creating user and one or more collaborating users) can edit the draft concurrently, e.g., as described above with reference to FIG. 10. Further, in some embodiments, additional collaborating users can be subsequently added to a collaborative draft by the creating user and/or by previously-added collaborating users. Thus, for example, even after one or more collaborators has been added, the option to add collaborators at block 1404 can continue to be enabled for the creating user and/or the collaborating users. Editing the draft and adding collaborating users can continue as desired.

If, at block 1416, the user indicates that the draft should be sent, then at block 1418, the draft can be sent to the designated recipients (e.g., all recipients identified in "to" field 1004 of screen 1000 of FIG. 10, or in a "CC" or "BCC" field). For example, client 202 can send an instruction to message management service 200 to send the draft. The draft that is sent can be, e.g., the version that is current on the client of the author who generates the instruction to send. In some embodiments, message management service 200 may enforce a policy that all authors indicate agreement to send the same version of the message before the message is actually sent; an example of a process to enforce this policy is described below. After sending, client 202 can exit the composition interface at block 1420 (e.g., returning to the screen from which the user initiated composition).

Instead of sending the draft at block 1416, the user may elect to close the draft and possibly return to it at another time, e.g., by operating "Cancel" element 1042 of screen 1000 of FIG. 10. If, at block 1422, the user indicates that the draft should be closed, then at block 1424, client 202 can send an updated draft to message management service 200 (if the update was not already sent as part of a real-time collaborative editing process) before exiting the composition interface at block 1420. Client 202 can also notify message management service 200 that the user has closed the draft, even if an updated version is not sent; this can allow message management service 200 to track which authors are currently editing the draft. In some embodiments, when the user elects to close the draft, the user may be prompted to save or discard the draft. Discarding a collaborative draft can remove it from the user's drafts folder but not from the drafts folders of other authors. In some embodiments, if the user discards a collaborative draft, this can be interpreted as opting out of the collaboration, and the user can be removed from the author list for the collaborative draft. In other embodiments, a specific prompt to leave the collaboration can be provided if the user indicates that a collaborative draft should be discarded.

Figure 15:
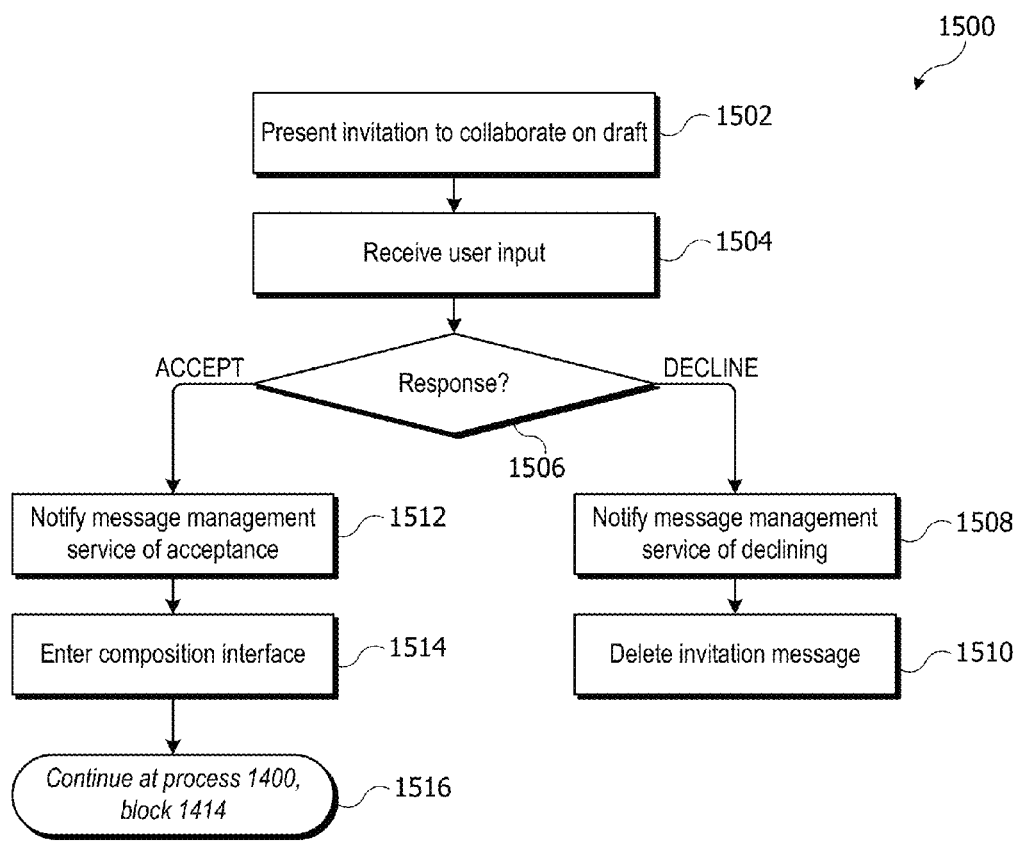
FIG. 15 is a flow diagram of a process that can be executed by a client that receives an invitation to collaborate according to an embodiment of the present invention.

The client of a collaborating user (e.g., client 206 of FIG. 2) can also execute portions of process 1400, e.g., if the collaborating user accepts an invitation to collaborate. FIG. 15 is a flow diagram of a process 1500 that can be executed by a client that receives an invitation to collaborate, e.g., client 206 of FIG. 2, according to an embodiment of the present invention. At block 1502, client 206 can present the invitation to the user. For instance, the invitation may be presented as a message in the user's inbox (e.g., message 806 as shown in FIG. 8), and the user can select the message to view and respond to the invitation (e.g., as shown in FIG. 9). At block 1504, client 206 can receive user input responding to the invitation. For instance, the user can operate "accept" control 906 or "decline" control 908.

If, at block 1506, the user declines the invitation, then at block 1508, client 206 can so notify message management service 200. At block 1510, client 206 can delete the invitation. In some embodiments, the user can delete an invitation from the inbox, and this can be interpreted as declining the invitation.

If, at block 1506, the user accepts the invitation, then at block 1512, client 206 can so notify message management service 200. At block 1514, client 206 can present a composition interface (e.g., similar or identical to interface screen 1000 of FIG. 10). Thereafter, at block 1516, client 206 can execute process 1400 (e.g., beginning at block 1414) to allow the user to edit, send, and/or further share the draft. Thus, in some embodiments, the only difference between the user experience for a creating user and a collaborating user is that the creating user starts the process of collaborating. Others can join in, on an equal basis if all authors have the same permissions, or as secondary authors with more limited permissions (e.g., read and comment only).

Figure 16:
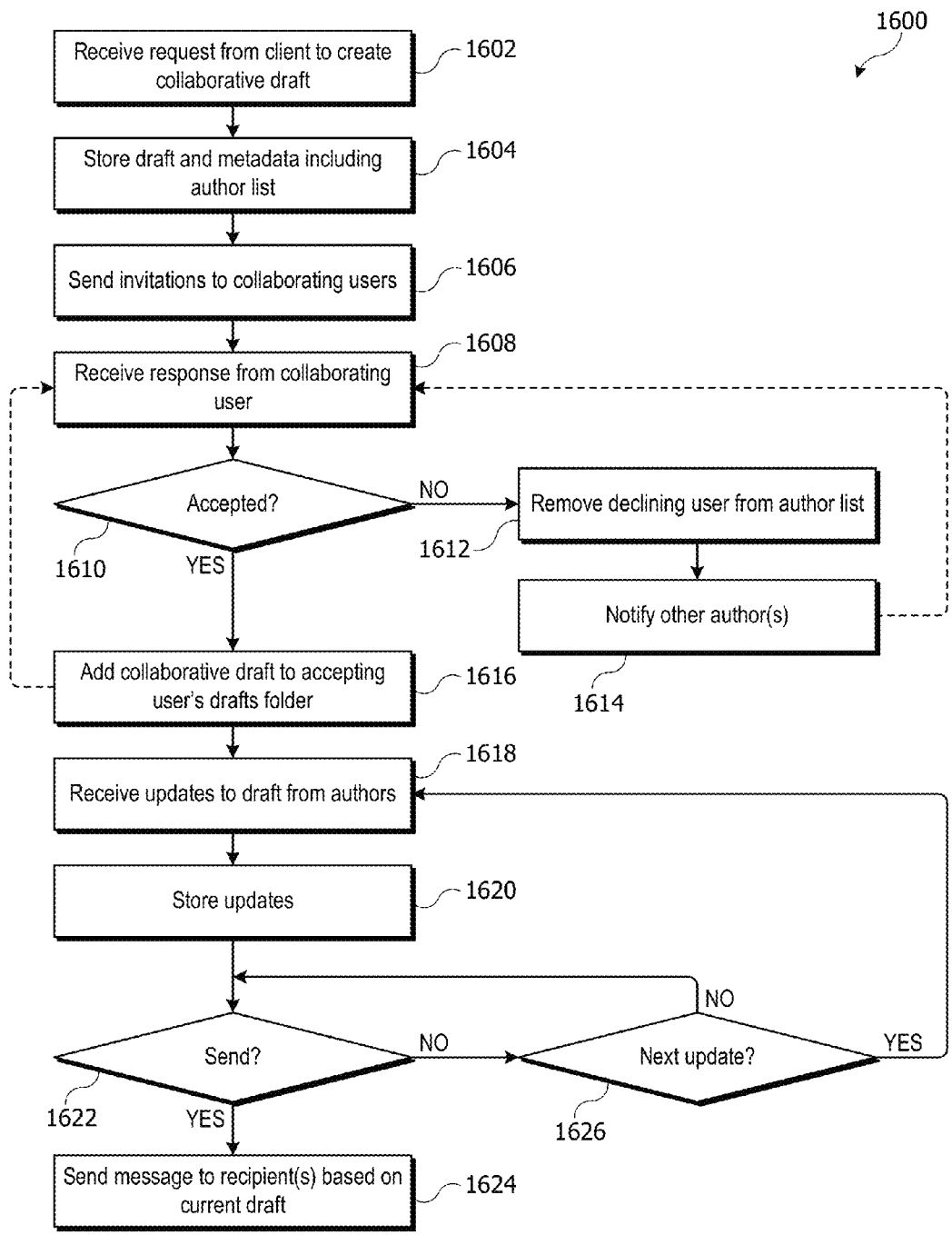
FIG. 16 is a flow diagram of a process that can be executed by a message management service according to an embodiment of the present invention.

At various points in processes 1400 and 1500, clients 202 and 206 may communicate with message management service 200. Message management modules 212 can facilitate the communication. FIG. 16 is a flow diagram of a process 1600 that can be executed by message management modules 212 according to an embodiment of the present invention.

Process 1600 can begin at block 1602 when message management service 200 receives a request from a client (e.g., client 202 executing block 1412 of process 1400) to create a collaborative draft. The request can include content of the draft and metadata, such as a list of one or more collaborating users to be included as authors along with the user whose client originates the request. At block 1604, message management service 200 can store the draft and metadata, e.g., in draft cache 230. At block 1606, message management service 200 can send invitation messages to the collaborating users (e.g., to client 206). The messages can be similar to the message shown in FIG. 9.

At block 1608, message management service 200 can receive a response from an invited user (e.g., from client 206 at block 1508 or 1512 of process 1500). The response can indicate either accepting or declining the invitation. If, at block 1610, the response is to decline, then at block 1612, message management service 200 can remove the user who declined from the author list, and at block 1614, message management service 200 can notify the user who issued the invitation (and optionally other authors who have accepted their invitations). If, at block 1610, the invited user accepts the invitation, process 1600 can continue at block 1616. It is to be understood that multiple invitations can be issued and any combination of responses can be received. Process 1600 can continue beyond blocks 1614 and 1616 without waiting for responses to be received from all of the invited users, and responses to invitations can be processed as they arrive.

At block 1618, message management service 200 can receive updates to the draft from clients of any author (e.g., clients 202 and/or 206). In some embodiments, message management service 200 can implement conflict resolution mechanisms to address conflicting edits received from different clients, e.g., as described in above-referenced U.S. patent application Ser. No. 14/552,166. In addition or instead, message management service 200 can implement or support a real-time collaborative editing process via which multiple authors can concurrently edit the document and see each other's edits. At block 1620, message management service 200 can store updates to the draft.

At any point, message management service 200 can receive an instruction from one or more of clients 202, 206 to send the draft. If, at block 1622, a send instruction is received, then at block 1624, message management service 200 can send the draft as a message to the designated recipient(s). Alternatively, as described below, message management service 200 can wait to send the draft until a send instruction has been received from all authors. Sending the draft as a message can include, e.g., identifying a current version of the draft, formatting the message content, creating headers to identify the authors and recipient(s), etc. If a send instruction is not received, then at block 1626, process 1600 can wait for more updates (block 1618) or a send instruction (block 1622).

Figure 17:
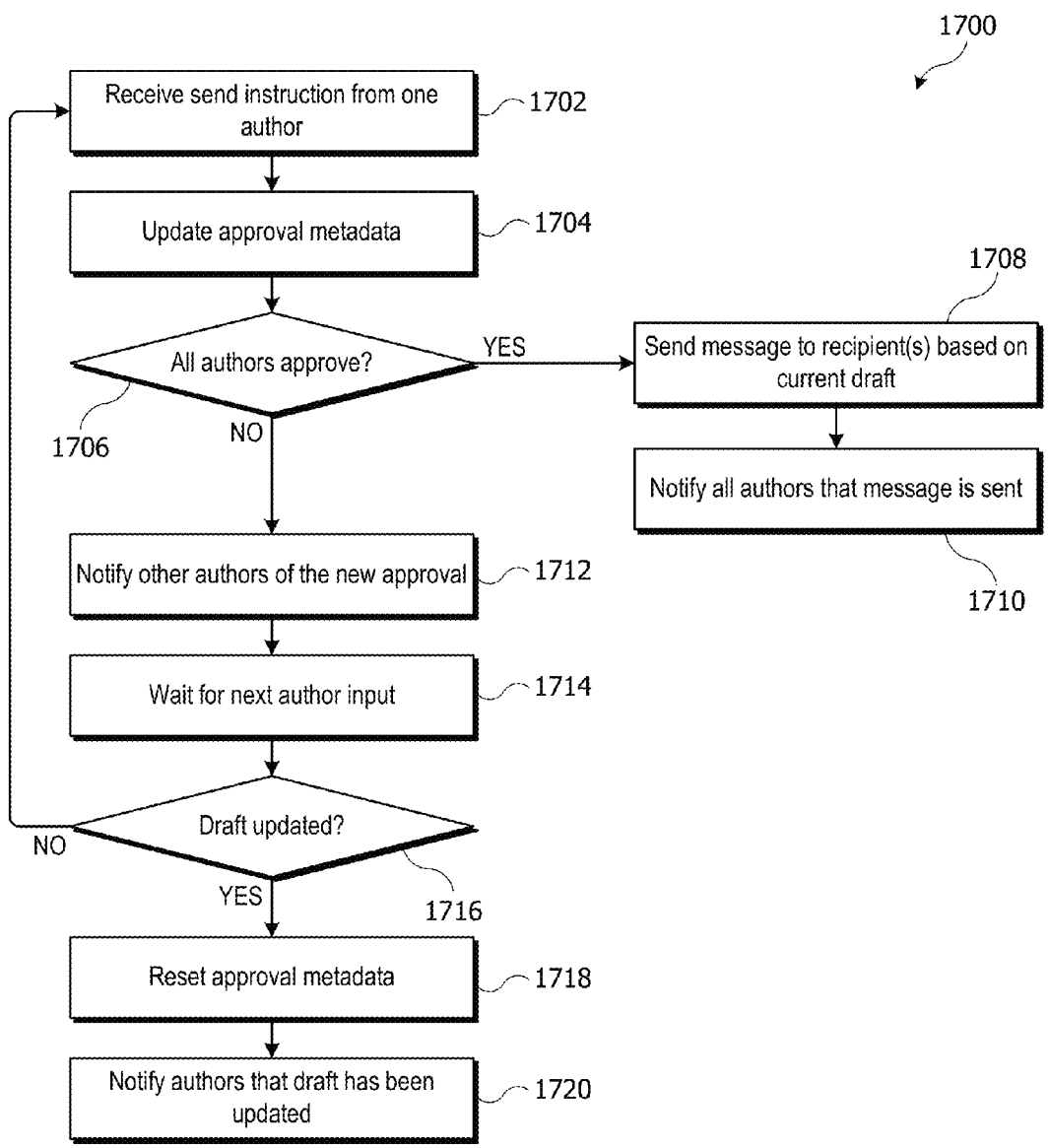
FIG. 17 is a flow diagram of a process for managing author approvals of a collaborative draft according to an embodiment of the present invention.

In some embodiments, process 1600 can incorporate an approval process such that a draft is sent to the designated recipient(s) only after all authors have approved. An author can indicate approval, e.g., by providing a send instruction to message management service 200. FIG. 17 is a flow diagram of a process 1700 for managing author approvals of a collaborative draft according to an embodiment of the present invention. Process 1700 can be implemented, e.g., in message management service 200. At block 1702, message management service 200 can receive a "send" instruction from a client of one of the authors. At block 1704, process 1700 can update metadata for the draft that indicates which authors have approved. The approval metadata can be stored, e.g., in author information table 450 of FIG. 4. For example, the entry for each author can include an approval flag that indicates whether the author has approved the current draft.

At block 1706, process 1700 can determine whether all authors have approved the draft message, e.g., by inspecting the approval metadata. If so, then at block 1708, the draft message can be sent to the designated recipient(s). Sending the draft as a message can include, e.g., identifying a current version of the draft, formatting the message content, creating headers to identify the authors and recipient(s), etc. At block 1710, process 1700 can notify all authors that the draft message has been sent. The notification can include generating a pop-up notification to be presented by the client, or simply removing the draft from the user's drafts folder. In some embodiments, sending the message at block 1708 can include sending a copy (e.g., CC or BCC) to each of the authors, and the presence of the copy of the sent message in the author's inbox can serve as a notification.

If, at block 1706, not all authors have approved the draft, then at block 1712, other authors can be notified of the approval by one author. For instance, updated metadata including the approval flags can be sent to the clients of the other authors. The clients can present this information to the authors using various techniques, including pop-up notifications, showing a comment in the draft, visually highlighting the names of authors who have approved (e.g., changing the font color of the approving author's name in collaborators line 1002 of FIG. 10, adding a check mark or other visual cue next to each author who has approved, or the like).

At block 1714, process 1700 can wait for further input. If, at block 1716, the input includes updating the draft, process 1700 can reset the approval metadata at block 1718 and notify all authors that the draft has been updated at block 1720. In some embodiments, if the draft is updated, all approval flags can be reset so that the draft is not sent until all authors approve the same version. In other embodiments, approval flags are not reset and an author might or might not be notified of edits that occur after she has approved a draft. In still other embodiments, authors can indicate whether they want to be notified of any edits that may occur after they have approved the draft. As long as the draft is not updated (or approval flags are not reset), process 1700 can continue to collect approvals until all authors have approved, at which time the draft can be sent.

It will be appreciated that the processes described herein are illustrative and that variations and modifications are possible. Steps described as sequential may be executed in parallel, order of steps may be varied, and steps may be modified, combined, added or omitted. In some instances, portions of a process can be executed repeatedly any number of times until a next event of interest occurs. Further, creating, editing, and sending a collaborative draft message need not occur in any particular time frame. For instance, a creating user can create and share a collaborative draft, then move on to other tasks and return to the collaborative draft at a later time (e.g., hours or even days later). Similarly, when a collaborating user accepts an invitation to collaborate, the draft can be saved and made accessible through the collaborating user's drafts folder at any time.

In some embodiments, messages can include one or more attachments. Where attachments are supported, some or all of the authors can be granted permission to add and/or edit attachments to the message. In some instances editing of attachments can also be a collaborative process.

In some embodiments, a collaborative message can be part of a thread. For instance, a user may decide to reply to (or forward) a received message and decide to solicit input from others on the reply. Assuming that reply messages can be composed using the same user interface as new messages, the techniques described above can also be used to add collaborators on a reply message. Where the reply message includes content of earlier messages in the thread, the collaborators can see this content, regardless of whether they were previously included in the thread. In embodiments where the creating user can edit the draft prior to sharing with collaborators (e.g., as described above), the creating user may choose to edit the message to remove content of earlier messages.

Embodiments described above can allow a user interface for collaborative drafting of messages to be integrated into a universal message drafting interface. Thus, users can do all their message drafting (collaborative and solo) with a single app and interface; there is no need to switch between apps or master a different user interface. Further, no extra steps are required for a user who wants to send a solo message; instead, users can opt in to the collaborative drafting mode.

Those skilled in the art will appreciate that numerous modifications are possible. For instance, in some embodiments, all authors of a collaborative email can be required to have accounts with the message management service. If an invited collaborator does not have an account with the message management service, the service can generate an invitation to sign up for the message management service and begin collaborating. In other embodiments, the message management service can provide a separate interface that allows authors who do not have accounts to interact with the collaborative draft. For example, the message management service can provide a web-based editing interface. If a user who does not have an account with the message management service is invited to collaborate on a message, the message management service can generate an invitation that includes a resource identifier (e.g., a URL) identifying a location where the invited user can access the collaborative draft. The location can be password-protected, and the message management service can provide a temporary password to the invited user. The web-based editing interface can have reduced functionality relative to editing within a client app provided by the message management service. For example, the web-based interface may support reading and commenting on, but not editing of, the collaborative draft message.

Other techniques can also be implemented to allow a collaborating user who does not have an account with the message management service to edit a collaborative draft. For example, a collaborating user who does not have an account with the message management service (or any collaborating user) can be invited to reply to the draft message and to provide her edits in the body of the reply message. The reply message can be received at the message management service. The message management service can compare the reply to the version of the draft that was sent and identify the edits. The edits can then be incorporated into the current draft maintained at the message management service and distributed to other authors, e.g., as described above. When other authors subsequently share their edits, the message management service can send to the collaborating user a new message that incorporates the updated draft, and the collaborating user can make further edits by replying to that message. In some embodiments, the collaborating user can indicate approval by including a specific comment in the subject line or first line of the reply message (e.g., "approved," "no changes," or the like).

Real-time editing and/or non-real-time editing can be supported. For real-time editing, any mechanism that allows authors can see their co-authors' edits as they happen can be used; examples are known in the art. For non-real-time editing, the author can provide edits to the client, and the client can transmit the edits, e.g., as an updated draft, to the message management service at an appropriate point (e.g., when the author indicates the edits should be shared). If the author is editing while the client is offline (i.e., not communicably connected to the message management service), the client can transmit the updated draft to the message management service the next time a connection is established. Authors who are not editing in real-time can be notified of edits made by other authors, regardless of whether the other authors are editing in real-time or non-real-time modes. For example, as described above with reference to FIG. 5, an author's drafts folder can show status indicators to notify one author that a collaborative draft has been edited by another author. Other notification options include email notifications (e.g., sending the updated draft to co-authors), pop-up notifications, and/or any other form of notification supported by a particular client. In some embodiments, users can specify their preferences for how to be notified of updates to collaborative draft messages, and such preferences can be specified on a global or per-draft basis.

Collaborative messages can be sent to any recipient, regardless of whether the recipient has an account with the message management service. In some embodiments, the message management service can append content to the message inviting the recipient to use the message management service; such content can be conditionally hidden or displayed depending on whether the recipient uses a client app of the message management service to view the message.

Further, embodiments described above refer to a message management service as conducting various collaborative drafting operations, such as issuing invitations to collaborating users, storing the collaborative draft message, sending the message and so on. In some embodiments, other services can perform some or all of these operations. For example, message management service 200 of FIG. 2 can leverage messaging services 204 to send invitations or other messages to the authors, and to send the collaborative message to the designated recipient(s). As another example, message management service 200 of FIG. 2 can leverage the collaborative editing functionality of another service (e.g., online content management service 240). The collaborative draft message can be stored on the online content management service, and the message management service can distribute links or other references to the storage location of the draft at the online content management service. As yet another example, some or all of the operations described as being performed by a message management service can instead be implemented in a messaging service, e.g., to allow users who subscribe to the messaging service to collaborate with each other.

The term "editing," as used herein, encompasses any type of modification a user can make to a draft message. Examples of editing include adding content, deleting content, altering content, adding or removing comments on the content, formatting, attaching other content items to the draft message, removing or modifying previously attached content items, modifying header fields (e.g., subject line, recipient list), inviting collaborators, and so on.

In some embodiments, the set of editing actions permitted to a particular author can be regulated, with different authors on the same collaborative draft being given different permissions with regard to that draft. The permissions of a particular author, as well as the set of defined permissions, can also be varied. In some embodiments, all authors can have the same set of permissions. In other embodiments, different authors can have different permissions, and permissions can be controlled automatically (e.g., only the creating user has the send permission) or manually (e.g., through a user interface option that allows any author to grant any or all of the permissions she has to another author). A given user can have any number of drafts in progress at a given time, including any number of collaborative drafts, and for each draft the user can have a different set of permissions. Permissions can be enforced by the client and/or the server, as desired. For example, if a particular author does not have write permission (or other permission to change the message content), the client can disable editing functions, or the server can ignore edits received from a client belonging to an author who does not have write permission. As another example, if a particular user does not have send permission, the client can disable a "send" control in the user interface, or the server can ignore a send instruction received from a client belonging to an author who does not have write permission.

As described above, the message as sent can include information identifying the message as being jointly from all of the authors. In some embodiments, an author can opt out of being identified to the recipient as a co-author. Some embodiments may also identify authors based on their permission level; for instance, an author with only read and comment permissions might not be identified to the recipient as an author.

Figure 18:
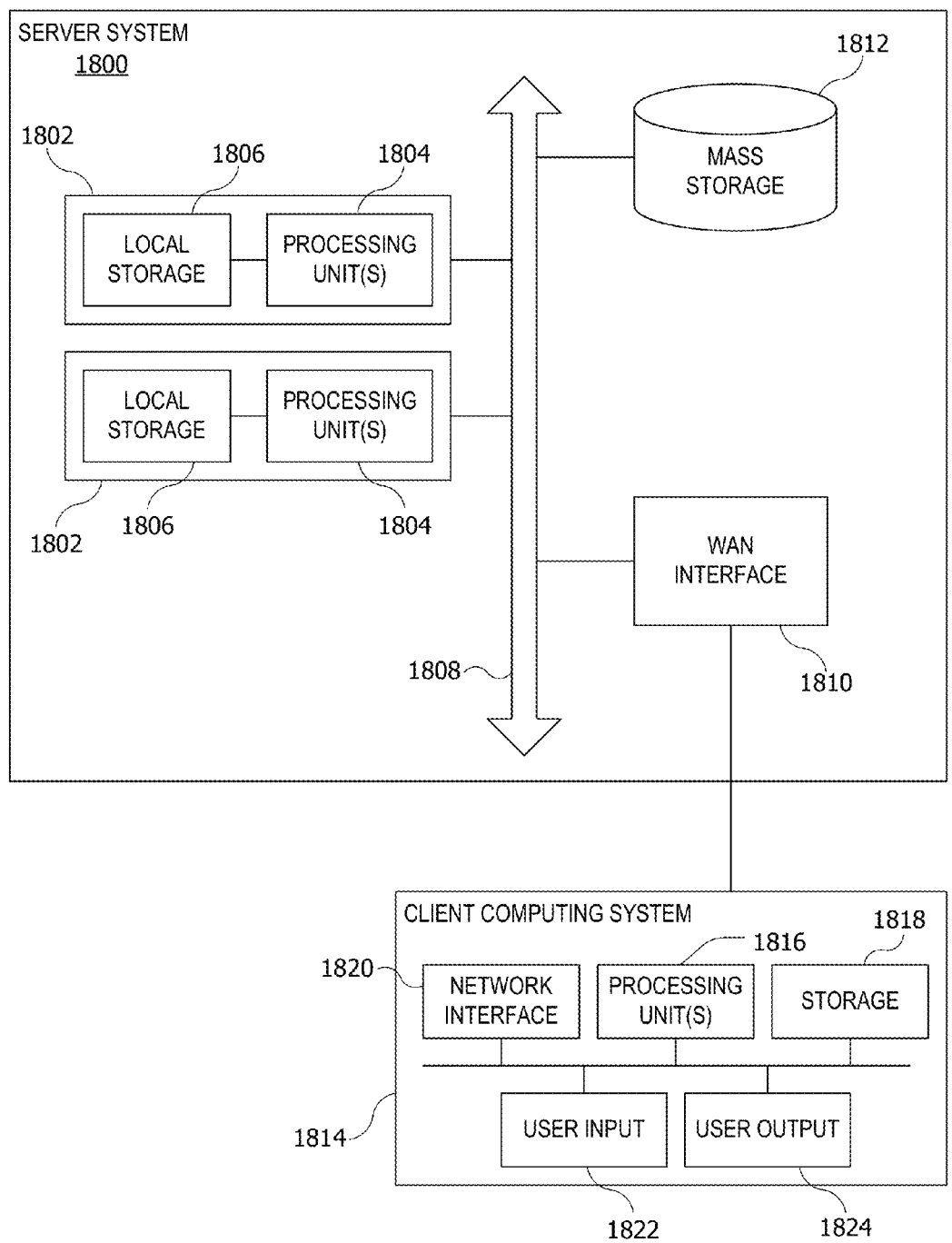
FIG. 18 shows a simplified block diagram of a representative server system and client computer system usable to implement certain embodiments of the present invention.

Various operations described herein can be implemented on computer systems, which can be of generally conventional design. FIG. 18 shows a simplified block diagram of a representative server system 1800 and client computer system 1814 usable to implement certain embodiments of the present invention. In various embodiments, server system 1800 or similar systems can implement message management service 200, messaging services 204, or any other services or servers described herein or portions thereof. Client computer system 1814 or similar systems can implement client device 202, 206, or other clients described herein.

Server system 1800 can have a modular design that incorporates a number of modules 1802 (e.g., blades in a blade server implementation); while two modules 1802 are shown, any number can be provided. Each module 1802 can include processing unit(s) 1804 and local storage 1806.

Processing unit(s) 1804 can include a single processor, which can have one or more cores, or multiple processors. In some embodiments, processing unit(s) 1804 can include a general-purpose primary processor as well as one or more special-purpose co-processors such as graphics processors, digital signal processors, or the like. In some embodiments, some or all processing units 1804 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1804 can execute instructions stored in local storage 1806. Any type of processors in any combination can be included in processing unit(s) 1804.

Local storage 1806 can include volatile storage media (e.g., conventional DRAM, SRAM, SDRAM, or the like) and/or non-volatile storage media (e.g., magnetic or optical disk, flash memory, or the like). Storage media incorporated in local storage 1806 can be fixed, removable or upgradeable as desired. Local storage 1806 can be physically or logically divided into various subunits such as a system memory, a read-only memory (ROM), and a permanent storage device. The system memory can be a read-and-write memory device or a volatile read-and-write memory, such as dynamic random access memory. The system memory can store some or all of the instructions and data that processing unit(s) 1804 need at runtime. The ROM can store static data and instructions that are needed by processing unit(s) 1804. The permanent storage device can be a non-volatile read-and-write memory device that can store instructions and data even when module 1802 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 1806 can store one or more software programs to be executed by processing unit(s) 1804, such as an operating system and/or programs implementing various server functions such as functions of message management modules 212, messaging service interface 214, and/or client interface 210 of FIG. 2, or any other server(s) associated with messaging system 100 of FIG. 1. "Software" refers generally to sequences of instructions that, when executed by processing unit(s) 1804 cause server system 1800 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 1804. Software can be implemented as a single program or a collection of separate programs or program modules that interact as desired. From local storage 1806 (or non-local storage described below), processing unit(s) 1804 can retrieve program instructions to execute and data to process in order to execute various operations described above.

In some server systems 1800, multiple modules 1802 can be interconnected via a bus or other interconnect 1808, forming a local area network that supports communication between modules 1802 and other components of server system 1800. Interconnect 1808 can be implemented using various technologies including server racks, hubs, routers, etc.

A wide area network (WAN) interface 1810 can provide data communication capability between the local area network (interconnect 1808) and a larger network, such as the Internet. Conventional or other communications technologies can be used, including wired (e.g., Ethernet, IEEE 802.3 standards) and/or wireless technologies (e.g., Wi-Fi, IEEE 802.11 standards).

In some embodiments, local storage 1806 is intended to provide working memory for processing unit(s) 1804, providing fast access to programs and/or data to be processed while reducing traffic on interconnect 1808. Storage for larger quantities of data can be provided on the local area network by one or more mass storage subsystems 1812 that can be connected to interconnect 1808. Mass storage subsystem 1812 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 1812. In some embodiments, additional data storage resources may be accessible via WAN interface 1810 (potentially with increased latency).

Server system 1800 can operate in response to requests received via WAN interface 1810. For example, one of modules 1802 can implement a supervisory function and assign discrete tasks to other modules 1802 in response to received requests. Conventional work allocation techniques can be used. As requests are processed, results can be returned to the requester via WAN interface 1810. Such operation can generally be automated. Further, in some embodiments, WAN interface 1810 can connect multiple server systems 1800 to each other, providing scalable systems capable of managing high volumes of activity. Conventional or other techniques for managing server systems and server farms (collections of server systems that cooperate) can be used, including dynamic resource allocation and reallocation.

Server system 1800 can interact with various user-owned or user-operated devices via a wide-area network such as the Internet. An example of a user-operated device is shown in FIG. 18 as client computing system 1814. Client computing system 1814 can be implemented, for example, as a consumer device such as a smart phone, other mobile phone, tablet computer, wearable computing device (e.g., smart watch, eyeglasses), desktop computer, laptop computer, and so on.

For example, client computing system 1814 can communicate via WAN interface 1810. Client computing system 1814 can include conventional computer components such as processing unit(s) 1816, storage device 1818, network interface 1820, user input device 1822, and user output device 1824. Client computing system 1814 can be a computing device implemented in a variety of form factors, such as a desktop computer, laptop computer, tablet computer, smart phone, other mobile computing device, wearable computing device, or the like.

Processing unit(s) 1816 and storage device 1818 can be similar to processing unit(s) 1804 and local storage 1806 described above. Suitable devices can be selected based on the demands to be placed on client computing system 1814; for example, client computing system 1814 can be implemented as a "thin" client with limited processing capability or as a high-powered computing device. Client computing system 1814 can be provisioned with program code executable by processing unit(s) 1816 to enable various interactions with server system 1800 of a message management service such as accessing messages, performing actions on messages, and other interactions described above. Some client computing systems 1814 can also interact with a messaging service independently of the message management service.

Network interface 1820 can provide a connection to a wide area network (e.g., the Internet) to which WAN interface 1810 of server system 1200 is also connected. In various embodiments, network interface 1820 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 1822 can include any device (or devices) via which a user can provide signals to client computing system 1814; client computing system 1814 can interpret the signals as indicative of particular user requests or information. In various embodiments, user input device 1822 can include any or all of a keyboard, touch pad, touch screen, mouse or other pointing device, scroll wheel, click wheel, dial, button, switch, keypad, microphone, and so on.

User output device 1824 can include any device via which client computing system 1814 can provide information to a user. For example, user output device 1824 can include a display to display images generated by or delivered to client computing system 1814. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 1824 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1804 and 1816 can provide various functionality for server system 1800 and client computing system 1814, including any of the functionality described herein as being performed by a server or client, or other functionality associated with message management services.

It will be appreciated that server system 1800 and client computing system 1814 are illustrative and that variations and modifications are possible. Computer systems used in connection with embodiments of the present invention can have other capabilities not specifically described here. Further, while server system 1800 and client computing system 1814 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

While the invention has been described with respect to specific embodiments, one skilled in the art will recognize that numerous modifications are possible. For instance, although specific processes for inviting users to collaborate on a message, accepting such invitations, editing collaborative draft messages, and sending collaborative messages have been described, other processes can be implemented. Embodiments of the invention can be realized using a variety of computer systems and communication technologies including but not limited to specific examples described herein.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
    receiving, at a server, a request from a first client of a creating user to create a collaborative draft of a message, the request including an identifier of a message recipient, an identifier of a collaborating user, and message content;
    storing, by the server, a draft message in association with an author list identifying a plurality of authors for the message, the authors including the creating user and the collaborating user, the draft message including the received message content;
    generating and sending, by the server, an invitation to the collaborating user at a second client;
    in response to the collaborating user accepting the invitation, adding, by the server, the draft message to a drafts folder maintained by the server for the collaborating user;
    receiving, by the server, one or more updates to the draft message from one or more of the authors;
    storing, by the server, an updated draft message based on the received one or more updates;
    propagating, by the server, the updated draft message to at least one of the authors; and
    in response to a send instruction from one or more of the authors, sending the updated draft message as a message to the message recipient, the message including an author-identifying field that identifies each of the authors.

2. The method of claim 1 further comprising:
    in response to receiving each of the one or more updates to the draft, notifying one or more of the first client or the second client of the update.

3. The method of claim 1 wherein the message is sent as an email message and the author-identifying field includes an email address of the creating user and an email address of the collaborating user.

4. The method of claim 1 wherein the request includes identifiers of a plurality of collaborating users and the plurality of authors further includes each of the collaborating users.

5. The method of claim 1 wherein generating the invitation includes:
    including, in the invitation, a representation of the message content.

6. The method of claim 5 wherein receiving the one or more updates includes:
    receiving, by the server, a reply message to the invitation, the reply message including an edited version of the message content;
    comparing, by the server, the edited version of the message content to the message content that was included in the invitation; and
    identifying one or more changes to the message content based on the comparing,
    wherein the server incorporates the one or more changes into the updated draft message.

7. The method of claim 1 wherein sending the updated draft message as a message to the message recipient occurs in response to receiving a send instruction from each of the authors.

8. The method of claim 1 wherein propagating the updated draft message includes synchronizing the updated draft message with a local draft message stored on a client device belonging to one of the authors.

9. A computer system comprising:
    a client interface to communicate with a plurality of client devices belonging to a plurality of users, including a first client device belonging to a first user and a second client device belonging to a second user; and
    a processor coupled to the client interface and configured to:
        receive a request from the first client device to create a collaborative draft of a message, the request including an identifier of a message recipient, an identifier of one or more collaborating users including the second user, and message content;
        store a draft message in association with an author list identifying a plurality of authors for the message, the plurality of authors including the creating user and each of the collaborating users, the draft message including the received message content;
        add the draft message to a first drafts folder maintained by the server for the first user and a second drafts folder maintained by the server for the second user;
        receive one or more updates to the draft message from one or more of the authors;
        store an updated draft message based on the received one or more updates;
        propagate the updated draft message to a selected subset of the plurality of client devices, the selected subset including at least the first client device and the second client device; and
        send the updated draft message as a message to the message recipient, the message including author-identifying information that identifies each of the authors.

10. The computer system of claim 9 wherein the processor is further configured to:
    receive an instruction to send the message from one of the authors,
    wherein sending of the updated draft message to the message recipient occurs in response to receiving the instruction.

11. The computer system of claim 9 wherein the processor is further configured to:
    receive an instruction to send the message from one of the authors; and
    determine whether the author that provided the instruction has permission to send the message,
    wherein sending of the updated draft message to the message recipient occurs in response to determining that the author that provided the instruction has permission to send the message.

12. The computer system of claim 9 wherein the processor is further configured to:
    receive, separately, an instruction to send the message from each of the authors;
    update, in response to receiving an instruction to send the message, approval metadata indicating whether an instruction to send the message has been received from each of the authors; and
    determine whether the approval metadata indicates that instructions to send the message have been received from all of the authors,
    wherein sending of the updated draft message to the message recipient occurs in response to determining that the approval metadata indicates that instructions to send the message have been received from all of the authors.

13. The computer system of claim 9 wherein the processor is further configured such that sending the message includes:

selecting one of the authors as a message sender;

identifying a messaging-service account of the message sender; and sending the message using the messaging-service account of the message sender.

14. The computer system of claim 9 wherein the message is an email message and the author-identifying information is included in a header of the email message.

15. The computer system of claim 9 wherein the processor is further configured such that propagating the updated draft message occurs in real time for at least one of the selected subset of the clients.

16. A method comprising:

presenting, at a client device, an editing interface operable by a user of the client device to create and edit a draft message, the editing interface further including a user-operable share control and a user-operable send control;

in response to user operation of the share control at any time during creating and editing of a draft message:
prompting, by the client device, the user to identify one or more other users as collaborating users; and
sending, by the client device, an instruction to a message management service to create a collaborative draft message, the instruction including a current version of a draft message created in the editing interface and further including identifiers of the one or more collaborating users;

subsequently to sending the instruction to create the collaborative draft message, receiving, at the client device, an update to the collaborative draft message from the message management service, the update originating from one of the collaborating users; and in response to user operation of the send control, sending, by the client device, an instruction to the message management service to send the collaborative draft message to the recipient.

17. The method of claim 16 further comprising, in response to user operation of the share control:

providing, at the client device, a permission control element operable by the user to assign one or more permissions from a set of permissions to at least one of the collaborating users.

18. The method of claim 16 wherein the update to the collaborative draft message is received while the client device is presenting the editing interface, the method further comprising:

presenting, by the client device, the received update to the user at the editing interface in real-time.

19. The method of claim 16 further comprising:

in response to receiving the update to the collaborative draft message, generating. by the client device, a notification of the update to the user.

20. The method of claim 19 wherein generating the notification of the update includes:

presenting, by the client device, an interface screen that includes a list of draft messages in a drafts folder specific to the user, the list including a representation of the collaborative draft message; and including in the representation of the collaborative draft message a visual indicator that the collaborative draft message has been updated by one of the collaborating users.

* * * * *